US007424286B2

(12) United States Patent
Okada

(10) Patent No.: US 7,424,286 B2
(45) Date of Patent: Sep. 9, 2008

(54) TRANSMITTER/RECEIVER SYSTEM, MOBILE TRANSMITTER/RECEIVER APPARATUS, COMMUNICATION MANAGEMENT APPARATUS, BROADCASTING STATION CARRIER RECEIVER APPARATUS, AND METHOD OF ATTEMPTING COMMUNICATION OF CALL ORIGINATION INFORMATION

(75) Inventor: Hiroki Okada, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 848 days.

(21) Appl. No.: 10/181,144

(22) PCT Filed: Jan. 22, 2001

(86) PCT No.: PCT/IB01/00064

§ 371 (c)(1),
(2), (4) Date: Jul. 15, 2002

(87) PCT Pub. No.: WO01/54429

PCT Pub. Date: Jul. 26, 2001

(65) Prior Publication Data

US 2003/0040302 A1    Feb. 27, 2003

(30) Foreign Application Priority Data

Jan. 20, 2000    (JP)    ............................. 2000-012150

(51) Int. Cl.
*H04M 3/42* (2006.01)
(52) U.S. Cl. .................. 455/414.1; 455/421; 455/422.1
(58) Field of Classification Search ................. 455/415, 455/414.1, 421, 422.1
See application file for complete search history.

(56) References Cited

U.S. PATENT DOCUMENTS

| 5,802,470 | A  | * | 9/1998 | Gaulke et al. ............. 455/426.1 |
| 6,285,750 | B1 | * | 9/2001 | Brachman et al. ......  379/211.02 |
| 6,438,371 | B1 | * | 8/2002 | Fujise et al. ............. 455/422.1 |
| 6,675,002 | B1 | * | 1/2004 | Lipovski ................... 455/194.1 |

(Continued)

FOREIGN PATENT DOCUMENTS

EP    0 784 412 A2    7/1997

(Continued)

*Primary Examiner*—Duc Nguyen
*Assistant Examiner*—Wayne Cai
(74) *Attorney, Agent, or Firm*—Oliff & Berridge, PLC

(57) ABSTRACT

Besides a plurality of base stations (64) enabling telephone calls between mobile terminals (30) and between the mobile terminals (30) and fixed telephones (12), a call management apparatus (60) is further provided a broadcasting station (72) that transmits call origination information via a broadcasting station carrier of a frequency band that is lower than that of a telephone call carrier. Furthermore, each mobile terminal (30) is provided with a broadcasting station carrier receiver portion capable of receiving broadcasting station carriers. An exchange control station (70) transmits call origination information from the broadcasting station (72) via a broadcasting station carrier if a mobile terminal (30) is in a state in which it is incapable of transmission/reception via the telephone call carrier. Since broadcasting station carriers have a better electromagnetic reflection characteristic than telephone call carriers, each mobile terminal (30) can receive call origination information by using the broadcasting station carrier receiver portion even if the mobile terminal (30) is in a state in which it is incapable of transmission/reception via the telephone call carrier. Thus, the communication of call origination information to the mobile terminals (30) can be improved.

55 Claims, 10 Drawing Sheets

U.S. PATENT DOCUMENTS

2001/0028685 A1 * 10/2001 Sydon et al. ................. 375/285
2004/0036625 A1 * 2/2004 Omata et al. ........... 340/825.69

FOREIGN PATENT DOCUMENTS

| | | | |
|---|---|---|---|
| EP | 0 843 428 A2 | | 5/1998 |
| GB | 2 227 143 A | | 7/1990 |
| GB | 2227143 | * | 7/1990 |
| GB | 2227143 A | * | 7/1990 |
| JP | A 49-131502 | | 12/1974 |
| JP | A 4-343535 | | 11/1992 |
| JP | A 06-197385 | | 7/1994 |
| JP | A-07-303271 | | 11/1995 |
| JP | A-08-331649 | | 12/1996 |
| JP | A 9-182155 | | 7/1997 |
| JP | A-2001-204074 | | 7/2001 |

* cited by examiner

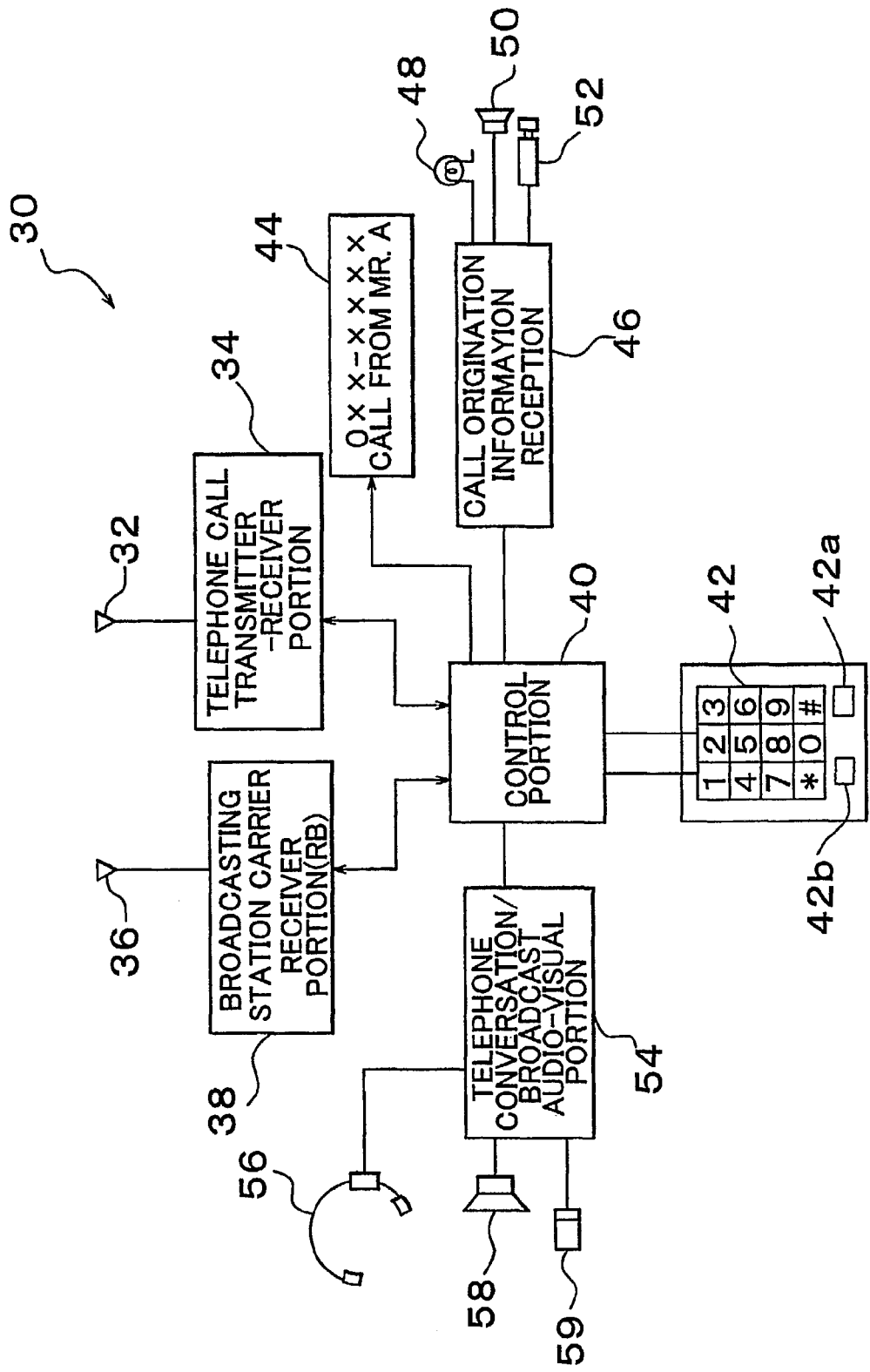

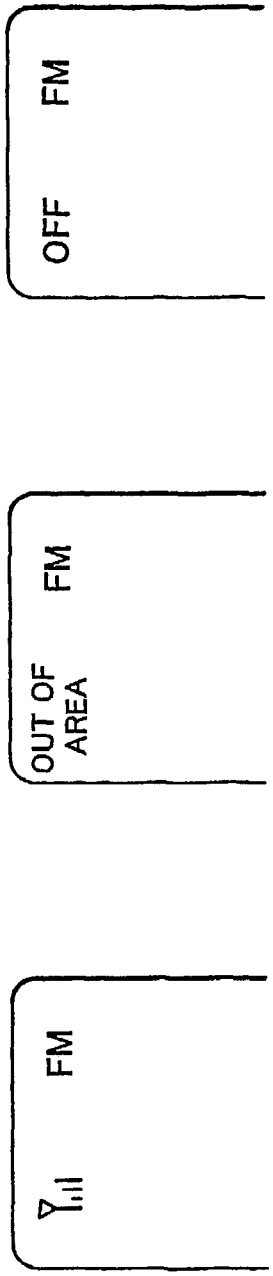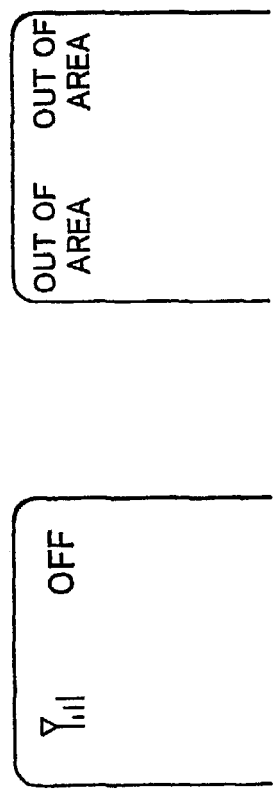

TRANSMITTER/RECEIVER SYSTEM, MOBILE TRANSMITTER/RECEIVER APPARATUS, COMMUNICATION MANAGEMENT APPARATUS, BROADCASTING STATION CARRIER RECEIVER APPARATUS, AND METHOD OF ATTEMPTING COMMUNICATION OF CALL ORIGINATION INFORMATION

FIELD OF THE INVENTION

The invention relates to a transmitter/receiver system, a mobile transmitter/receiver apparatus, a communication management apparatus, a broadcasting station carrier receiver apparatus, and a method of attempting communication of call origination information. More particularly, the invention relates to a transmitter/receiver system comprising at least one mobile transmitter/receiver apparatus as well as a transmitter/receiver management apparatus that manages transmission to and reception from the mobile transmitter/receiver apparatus, a mobile transmitter/receiver apparatus for use in the system, a communication management apparatus that manages an exchange of audio data via communication links between communication terminals, a broadcasting station carrier receiver apparatus that receives a broadcasting station carrier as used for transmission and reception of radio or television broadcasts and that outputs speech/sounds, characters, and/or images, and a method of attempting communication of call origination information to a target communication terminal.

BACKGROUND OF THE INVENTION

As a transmitter/receiver system, a system having one or more mobile telephones, which may include one or more vehicle telephones, and a transmitter/receiver management apparatus that manages transmission and reception between the mobile telephones has been proposed. Transmission and reception is carried out using a carrier in an ultra-high-frequency band, e.g. an 800-MHz band at the lowest, a 1.5-GHz band, 1.9-GHz band, a 2-GHz band, etc.

In such a transmitter/receiver system, as the frequency band of the carrier becomes higher, the rectilinear propagation characteristic of the carrier becomes stronger. That is to say, reflection of the electromagnetic waves reduces, so that communications become difficult in buildings, especially deep inside buildings. The antenna also suffers from shadowing by the human body, so that, when the mobile transmitter/receiver is put into a pocket, the reception performance of the antenna may deteriorate remarkably in comparison with a hand-held state.

On account of the effect electromagnetic radiation produced by mobile telephones has upon medical appliances, it is either requested that mobile telephones be powered off in hospitals or, in some cases, devices for intentionally generating interference (i.e. jamming devices) are provided to disable telephone calls. Furthermore, it is requested that mobile telephones be powered off as a courtesy in restaurants, hotels, trains, etc. In these cases, mobile telephones cannot receive calls, and are therefore useless in enabling the person carrying the mobile telephone to respond to an emergency.

In the early period of the marketing of PHS telephones (PHS=personal handyphone system; a system in which the phone functions as a cordless phone in a limited-range, home environment and as a mobile phone elsewhere), a mobile/portable telephone combining the functions of a PHS and a pager was proposed that took into consideration the fact that the establishment of an infrastructure for PHS telephones would take time. According to the proposal, if such a PHS telephone was outside its area of communication, the pager would be used for paging. However, this type of mobile/portable telephone necessitates contracts with both PHS and pager service providers. Furthermore, the pager of such a mobile/portable telephone needs to be used when communication is not possible by calling its PHS number. Thus, a caller is require to appropriately choose between the PHS number and the pager number of the mobile/portable telephone being called/paged.

DISCLOSURE OF THE INVENTION

In addition to other objects cited elsewhere in this specification, it is a particular object of the invention to avoid the aforementioned disadvantages of the prior art and to improve call reception performance of a mobile transmitter/receiver apparatus.

This object is achieved by the transmitter/receiver system, the mobile transmitter/receiver apparatus, the communication management apparatus, the broadcasting station carrier receiver apparatus, and the method of attempting communication of call origination information as reflected in the independent claims. Preferred embodiments of the invention are reflected in the dependent claims.

A first mode of the invention is a portable transmitter/receiver system comprising:

one or more mobile transmitter/receiver apparatus comprising:
  telephone call transmission/reception means for transmitting and receiving respective audio data via a first carrier of a first frequency band and for receiving respective first call origination information via said first carrier; and
  call origination reception means for receiving respective second call origination information via a second carrier of a second frequency band that is different from said first frequency band; and
a transmission/reception management apparatus that manages transmission to and reception from any of said mobile transmitter/receiver apparatus, said transmission/reception management apparatus comprising:
  telephone call management means for governing an exchange, employing said first carrier, of said respective audio data between any of said mobile transmitter/receiver apparatus and either another mobile transmitter/receiver apparatus or a communication apparatus connected to said transmission/reception management apparatus;
  first call information transmission means for transmitting, when a call is made to any one of said mobile transmitter/receiver apparatus, said respective first call origination information via said first carrier; and
  second call information transmission means for transmitting, when a call is made to said any one of said mobile transmitter/receiver apparatus, said respective second call origination information via said second carrier.

In this transmitter/receiver system, the transmission/reception management apparatus, at a time of a call to a mobile transmitter/receiver apparatus, transmits call origination information via the first call information transmission means using the first carrier also used for exchanging audio data with a mobile transmitter/receiver apparatus or a communication apparatus connectable to the transmission/reception management apparatus, and transmits call origination information via the call information transmission means using the second carrier of a frequency band different from that of the first carrier. The mobile transmitter/receiver apparatus receives the first call origination information transmitted via the first carrier by using the telephone call transmission/reception means, and receives the second call origination information transmitted via the second carrier by using the call information reception means. The mobile transmitter/receiver apparatus needs only to receive call origination information via either one of the first carrier and the second carrier. Therefore, the mobile transmitter/receiver apparatus can receive call origination information even if one of the carriers does not reach the mobile transmitter/receiver in sufficient strength for reception. As a result, the call reception performance of the mobile transmitter/receiver apparatus can be enhanced. The "call origination information" herein may include the telephone number of the caller or of the target apparatus, a brief message, etc. The call origination information transmitted via the first carrier may be identical to the call origination information transmitted via the second carrier, or may differ therefrom.

In the transmitter/receiver system, the second carrier preferably has a frequency of less than 1 GHz. Furthermore, in the mobile transmitter/receiver system, the second carrier may be a broadcasting station carrier as used for radio or television transmission/reception. Due to the tendency of such a carrier to reflect in an urban environment, the mobile transmitter/receiver apparatus can receive call origination information over a broad area. In the transmitter/receiver system of this mode of the invention, the second carrier may be a sideband of a carrier used by a broadcasting station that broadcasts in the transmitter/receiver system's area of use. In the transmitter/receiver system of the invention in a mode in which a broadcasting station carrier is used as the second carrier, the second call information transmission means may comprise means for transmitting the second call origination information by superimposing the information on the broadcasting station carrier.

Furthermore, in the transmitter/receiver system, the second call information transmission means may comprise means for transmitting the second call origination information a plurality of times. Thus, the probability of the mobile transmitter/receiver apparatus receiving call origination information can be increased. In the transmitter/receiver system of this mode of the invention, the second call information transmission means may comprise means for transmitting the second call origination information a plurality of times at predetermined intervals. This allows the mobile transmitter/receiver apparatus to confirm call origination information it has received. Furthermore, in the transmitter/receiver system of the mode of the invention in which the second call information transmission means transmits call origination information a plurality of times, the second call information transmission means may comprise means for transmitting the second call origination information a plurality of times at intervals that are changeable in accordance with call and/or carrier traffic. Such an embodiment contributes to equitably shared use of the system.

Furthermore, in the transmitter/receiver system, the second call information transmission means may comprise means for transmitting the second call origination information via the second carrier if the mobile transmitter/receiver apparatus has yet to receive call origination information although call origination information has been transmitted by the first call information transmission means a predetermined number of times. This allows unnecessary transmission of call origination information via the second carrier to be reduced.

Furthermore, in the transmitter/receiver system, the mobile transmitter/receiver apparatus may comprise first transmission on-off means for transmitting, to the transmission/reception management apparatus, information as to whether the transmission/reception management apparatus should transmit call origination information to the mobile transmitter/receiver apparatus via the second call information transmission means, and the transmission/reception management apparatus may comprise: second call information transmission control storage means for storing information as to whether transmission of the call origination information is to be performed by the second call information transmission means with respect to each of the mobile transmitter/receiver apparatus; and first control means for controlling the second call information transmission means such that the call origination information is transmitted by the second call information transmission means solely when information indicating that call origination information is to be transmitted is stored in the second call information transmission control storage means. This allows unnecessary transmission of call origination information via the second carrier to be reduced.

Still further, in the transmitter/receiver system, the mobile transmitter/receiver apparatus may comprise second transmission on-off means for transmitting, to the transmission/reception management apparatus, information as to whether the transmission/reception management apparatus should transmit call origination information to another mobile transmitter/receiver apparatus via the second call information transmission means, and the transmission/reception management apparatus may comprise second control means for, if the mobile transmitter/receiver apparatus has made a request for transmission of call origination information to another mobile transmitter/receiver apparatus, controlling the second call information transmission means such that the call origination information is only transmitted by the second call information transmission means if information indicating that call origination information is to be transmitted to the another mobile transmitter/receiver apparatus by the second call information transmission means is transmitted by the second transmission on-off means. Thus, unnecessary transmissions of call origination information via the second carrier can be reduced.

In accordance with a second mode of the invention, a mobile transmitter/receiver apparatus for use in a transmitter/receiver system comprising one or more mobile transmitter/receiver apparatus and a transmission/reception management apparatus that manages transmission to and reception from any of the mobile transmitter/receiver apparatus, the mobile transmitter/receiver apparatus comprising: telephone call transmission/reception means for transmitting and receiving audio data via a first carrier of a first frequency band and for receiving first call origination information via said first carrier; and call origination information reception means for receiving call origination information via a second carrier of a second frequency band that is different from the first frequency band.

In this mobile transmitter/receiver apparatus, the telephone call transmission/reception means exchanges audio data with another mobile transmitter/receiver apparatus or with a communication apparatus connectable to the transmission/reception management apparatus via the transmission/reception management apparatus by using the first carrier, and the call information reception means receives call origination information by using the second carrier of a frequency band that is different from that of the first carrier. According to the aforementioned mobile transmitter/receiver apparatus, if the transmission/reception management apparatus transmits call origination information by using the first carrier, the mobile transmitter/receiver apparatus can receive the call origination information via the telephone call transmission/reception means. If the transmission/reception management apparatus transmits call origination information by using the second carrier, the mobile transmitter/receiver apparatus can receive the call origination information via the call information reception means. Therefore, since call origination information can be received via either the first carrier or the second carrier, the mobile transmitter/receiver can receive call origination information even if one of the carriers does not reach the mobile transmitter/receiver apparatus. That is, the call reception performance of the mobile transmitter/receiver apparatus can be enhanced. As above, the "call origination information" herein may include the telephone number of the caller or of the target apparatus, a brief message, etc. The call origination information transmitted via the first carrier may be identical to the call origination information transmitted via the second carrier, or may differ therefrom.

In such an embodiment of the mobile transmitter/receiver apparatus, the second carrier is preferably a carrier having a frequency of at most 1 GHz. Furthermore, the second carrier may be a sideband of a broadcasting station carrier that is used for radio or television broadcasting. Due to the strong electromagnetic reflection characteristic of such a carrier, call origination information can be received over a broad area.

Furthermore, the mobile transmitter/receiver apparatus may further comprise telephone call transmission/reception on-off means for governing an on-off state of the telephone call transmission/reception means, and call information reception on-off means for governing an on-off state of the call information reception means. This allows a user to select functionality as needed.

Still further, the mobile transmitter/receiver apparatus may further comprise state display means for displaying the operating state of the telephone call transmission/reception means and the operating state of the call information reception means. Thus, a user is informed of the operating state of the telephone call transmission/reception means and the operating state of the call information reception means.

Preferably, the mobile transmitter/receiver apparatus comprises control means for controlling the telephone call transmission/reception means and/or the call information reception means based on the operating state of the telephone call transmission/reception means and the operating state of the call information reception means. Such an embodiment allows more appropriate use.

In the mobile transmitter/receiver apparatus in accordance with a mode of the invention in which the control means is provided, the control means may comprise means for limiting operation of the call information reception means when the telephone call transmission/reception means itself is capable of transmission to and reception from the transmission/reception management apparatus. This allows the energy efficiency of the mobile transmitter/receiver apparatus to be improved. In the mobile transmitter/receiver apparatus of this mode of the invention, the operational limitation of the call information reception means may consist of turning off the call information reception means.

In the mobile transmitter/receiver apparatus in accordance with an embodiment in which telephone call transmission/reception on-off means, call information reception on-off means and control means are provided, the control means may be means for limiting a search in which the telephone call transmission/reception means is prompted to check for recovered reception of said first carrier, said search being carried out when said call information reception means is in an "on" state as governed by the call information reception on-off means and the telephone call transmission/reception means has lost reception of said first carrier in spite of the fact that the telephone call transmission/reception means is in an "on" state as governed by the telephone call transmission/reception on-off means. This allows the mobile transmitter/receiver apparatus to conserve energy. In the mobile transmitter/receiver apparatus of this mode, the limitation of the search may comprise extending the interval between checks for recovered reception as a function of the elapsed time since previous reception. This allows energy to be used efficiently, i.e. energy to be conserved.

In the mobile transmitter/receiver apparatus of a mode in which telephone call transmission/reception on-off means and call information reception on-off means are provided, the control means may comprise means for limiting either a search in which said telephone call transmission/reception means is prompted to check for recovered reception of said first carrier or a search in which said call information reception means is prompted to check for recovered reception of the second carrier, said either of said searches being carried out when the telephone call transmission/reception means and the call information reception means have lost reception of the first and second carriers, respectively, in spite of the fact that both the telephone call transmission/reception means or the like and the call information reception means are in an "on" state as governed by the telephone call transmission/reception on-off means and the call information reception on-off means, respectively. This too allows the mobile transmitter/receiver apparatus to conserve energy. In the mobile transmitter/receiver apparatus of the invention of this mode, the control means may comprise means for limiting the search in which to check in which the the telephone call transmission/reception means is prompted to check for recovered reception of the first carrier.

In the mobile transmitter/receiver apparatus of a mode in which telephone call transmission/reception on-off means, call information reception on-off means and control means are provided, the control means may comprise means for setting the call information reception means to an "on" state regardless of the current state of the call information reception means is set to an "off" state, when the call information reception means provided that the telephone call transmission/reception means has lost reception of said first carrier in spite of the fact that the telephone call transmission/reception means is set to an "on" state by the telephone call transmission/reception on-off means in response to a predetermined signal. Thus, the mobile transmitter/receiver can receive call origination information and can notify a user that call origination information has been received. In the mobile transmitter/receiver of this mode of the invention, the predetermined signal may be a jamming signal that is intentionally generated for protecting electronic devices in a hospital, an amusement park, etc. Furthermore, in the mobile transmitter/receiver apparatus of these modes of the invention, the control means may comprise means for limiting the search in which the telephone call transmission/reception means is prompted to check for recovered reception of the first carrier, when the telephone call transmission/reception means has lost reception of said first carrier due to the predetermined signal. This also allows the mobile transmitter/receiver apparatus to conserve energy.

Preferably, in the mobile transmitter/receiver apparatus, the telephone call transmission/reception means may comprise means for, when the telephone call transmission/reception means is capable of reception of said first carrier, transmitting status information to the transmission/reception management apparatus. This allows the transmission/reception management apparatus to avoid performing unnecessary transmission of call origination information via the second carrier.

Furthermore, the mobile transmitter/receiver apparatus may comprise electronic key means that allow the mobile transmitter/receiver to adopt the capabilities of an electronic vehicular key. Thus, the mobile transmitter/receiver apparatus can be used to lock a door of a vehicle, unlock the door and start an engine of the vehicle.

Furthermore, the mobile transmitter/receiver apparatus may further comprise information output means for outputting at least a portion of the second call origination information received by the call information reception means speech/sounds, characters, and/or images. Thus, a user can be presented with at least a portion of the call origination information in the form of speech/sounds, characters, images or the like. In the mobile transmitter/receiver apparatus of this mode of the invention, the call information reception means may comprise means capable of receiving a radio broadcasting station carrier and/or a television broadcasting station carrier, and the information output means may comprise means for outputting the radio and/or television broadcast broadcast via the broadcasting station carrier received by the call information reception means. Thus, it becomes possible to listen to a radio broadcast or watch a television broadcast with the mobile transmitter/receiver apparatus.

A third mode of the invention is a communication management apparatus that manages an exchange of audio data via a physical and/or wireless communication link between communication terminals, the communication management apparatus comprising: call information transmission means capable of transmitting call origination information to a communication terminal via a predetermined carrier; and control means for controlling the transmission of the call origination information by the call information transmission means.

In this communication management apparatus, the call information transmission means transmits call origination information to a communication terminal via a predetermined carrier, and the control means controls transmission of the call origination information performed by the call information transmission means. Therefore, the communication management apparatus of the invention is able to transmit call origination information via a predetermined carrier in addition to performing a call via a communication link.

A fourth mode of the invention is a broadcasting station carrier receiver apparatus that receives a broadcasting station carrier as used for radio or television broadcasting and that outputs the broadcast broadcast via said broadcasting station carrier using speech/sounds, characters, and/or images, the broadcasting station carrier receiver apparatus comprising: call carrier reception means capable of receiving a predetermined carrier used by a communication management apparatus that manages an exchange of audio data via a physical and/or wireless communication link between communication terminals to transmit call origination information to one or more of said communication terminals; and call origination information output means for outputting the call origination information received by the call carrier reception means using speech/sounds, characters, and/or images.

In this broadcasting station carrier receiver apparatus, the call carrier reception means receives the predetermined carrier used by the communication management apparatus that manages an exchange of audio data via a physical and/or wireless communication link between communication terminals to transmit call origination information to a communication terminal. The call information output means outputs at least a portion of the call origination information received using speech/sounds, characters, and/or images. Therefore, in accordance with the broadcasting station carrier receiver apparatus of the invention, it becomes possible to output at least a portion of call origination information at a communication terminal in the form of speech/sounds, characters, images, or the like. As a result, a user is able to obtain at least a portion of the call origination information through use of the broadcasting station carrier receiver apparatus, even if the communication terminal is currently located outside the areas in which communication via an audio data link could be established, or even if other reasons prevent the user from using the communication terminal to receive an incoming call.

In the context of the aforementioned broadcasting station carrier receiver apparatus, the predetermined carrier may be a sideband of the broadcasting station carrier. Thus, the aforementioned broadcasting station carrier receiver apparatus can be implemented through slight modification of a broadcasting station carrier receiver apparatus capable of receiving a broadcasting station carrier.

Furthermore, the broadcasting station carrier receiver apparatus may further comprise: identification information storage means for storing at least one piece of identification information identifying each of one or more communication terminals; and identification information determination means for determining whether the received call origination information includes a piece of identification information stored by the identification information storage means, wherein the call information output means comprises means for outputting at least a portion of the call origination information if said determination by the identification information determination means is affirmative, i.e. if it is determined by the identification information determination means that the received call origination information includes a piece of identification information stored by the identification information storage means. It thus becomes possible to screen call origination information received by a communication terminal since only call origination information whose identification information is stored in the identification information storage means is selected and output. The broadcasting station carrier receiver apparatus of this mode of the invention may further comprise identification information change-addition-deletion means for changing, adding to, and deleting a piece of identification information stored by the identification information storage means. Furthermore, in the broadcasting station carrier receiver apparatus of this mode of the invention, the broadcasting station carrier receiver apparatus may be a radio apparatus installed in a vehicle, and the identification information storage means may comprise means for storing, in respective association with the at least one piece of identification information of the communication terminals, identification information identifying each of one or more electronic keys capable of locking a door of the vehicle, unlocking the door, and starting an engine of the vehicle, and the identification information determination means may comprise means for determining whether the received call origination information includes a piece of identification information stored by the identification information storage means in association with the identification information of the electronic key that has been used to unlock the door and/or start the engine. This makes it possible to provide automatic, user-dependent selection and output of call origination information, wherein call origination information is only selected and output if it is associated with a communication terminal whose identification information corresponds to the identification information of the electronic key.

A fifth mode of the invention is a method of attempting communication of call origination information to a target communication terminal employing: a physical and/or wireless communication link suitable for exchanging audio data between communication terminals; and/or a broadcasting station carrier as used for radio or television transmission/reception, wherein the decision whether said communication is to be attempted via said communication link, said broadcasting station carrier, or both depends on a caller's preference, the preference of a target communication terminal user, the ability to establish said communication link, and/or the success of attempted communication of said call origination information to said target communication terminal via said communication link.

Since, in accordance with method, communication of call origination information can be attempted via the communication link and/or the broadcasting station carrier, it is highly probable that the call origination information can be communicated to the target communication terminal. That is, even if communication via the communication link is not successful, it is possible that communication will be successful via the broadcasting station carrier.

In a preferred embodiment of the above method, if the success of attempted communication of said call origination information to said target communication terminal via said communication link cannot be confirmed, communication of said call origination information to said target communication terminal is attempted via said broadcasting station carrier. Since communication is first attempted via the communication link, unnecessary communication attempts via the broadcasting station carrier can be reduced.

In another preferred embodiment of the above method, if attempted communication via said broadcasting station carrier has been requested by a user of said target communication terminal, communication is attempted via said communication link and said broadcasting station carrier. Thus, use of the broadcasting station carrier for communication attempts may be made dependent on the target communication terminal's user's preference. In such an embodiment, use of the broadcasting station carrier can be regarded as a value-added service.

In a further alternative of the above method, if attempted communication via said broadcasting station carrier has been requested by a caller, communication is attempted via said communication link and said broadcasting station carrier. Thus, use of the the broadcasting station carrier for communication attempts can be made dependent on the caller's preference. In this embodiment use of the broadcasting station carrier can likewise be regarded as a value-added service.

BRIEF DESCRIPTION OF THE DRAWINGS

FIG. 2 is a schematic diagram illustrating a mobile terminal.

FIG. 3 are illustrations of a display portion showing examples of the display for various on-off states and the operating states of both a telephone call transmitter/receiver portion and a broadcasting station carrier receiver portion.

DETAILED DESCRIPTION OF THE PREFERRED EMBODIMENTS

Figure 1:
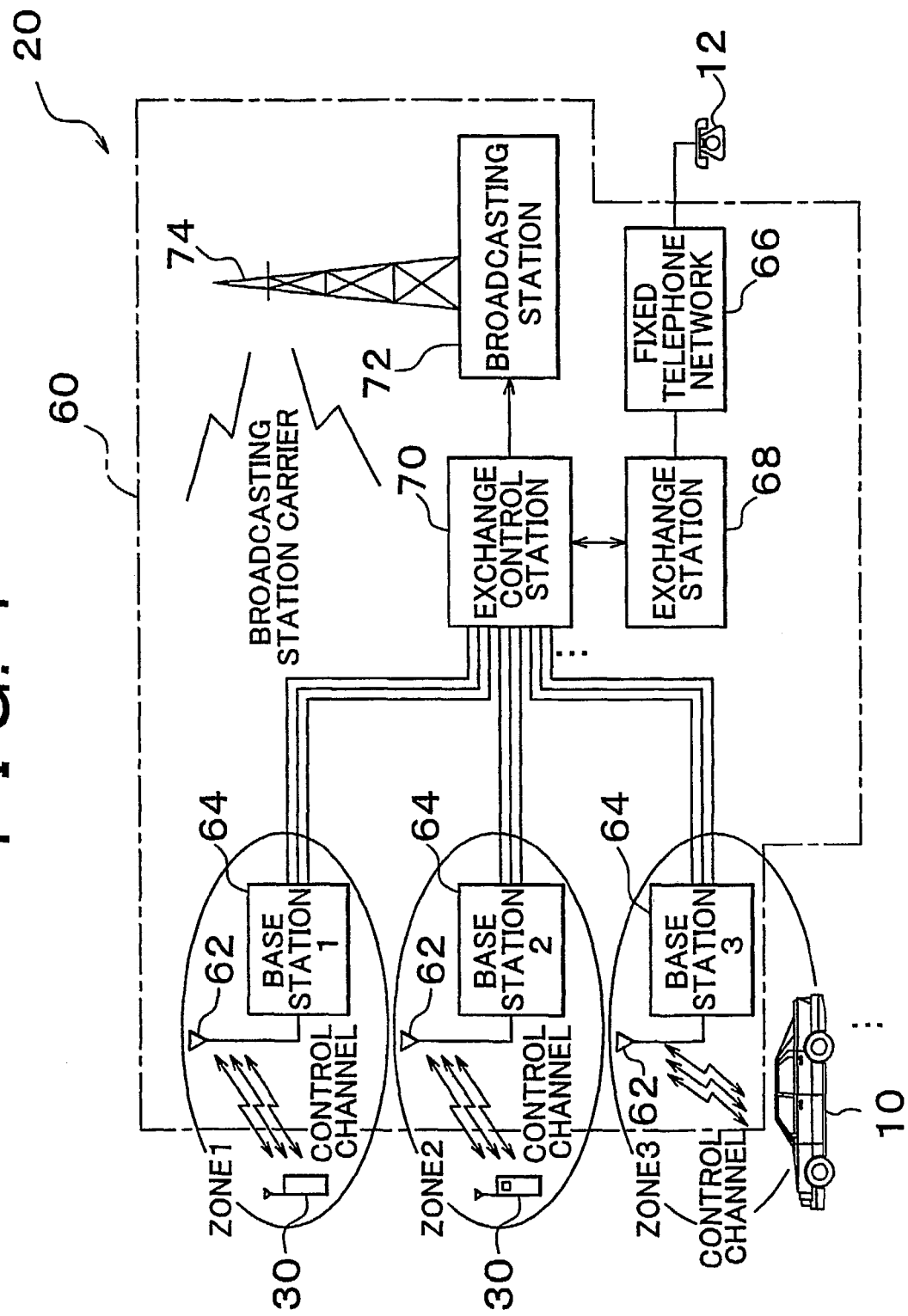
FIG. 1 is a schematic diagram illustrating a transmitter/receiver system in accordance with an embodiment of the invention.

The invention will be described hereinafter with reference to particular, preferred embodiments. FIG. 1 is a schematic diagram illustrating a transmitter/receiver system 20 in accordance with an embodiment of the invention. FIG. 2 is a schematic diagram illustrating a mobile terminal 30. As shown in FIG. 1, the transmitter/receiver system 20 of the embodiment comprises a plurality of mobile terminals 30 that may include one or more car telephones installed in vehicles 10 or the like, and a telephone call management apparatus 60 that manages telephone calls between mobile terminals 30 or between a fixed telephone 12 and a mobile telephone 30.

As shown in FIG. 2, a mobile terminal 30 comprises a telephone call transmitter/receiver portion 34 having a telephone antenna 32 capable of transmitting and receiving a first carrier of a first frequency band assigned as a telephone audio communication band to the mobile terminal 30, a broadcasting station carrier receiver portion 38 having a broadcasting station carrier antenna 36 capable of receiving a second carrier of a second frequency band assigned for broadcasting radio broadcasts, television broadcasts, etc., a control portion 40 that controls the telephone call transmitter/receiver portion 34, the broadcasting station carrier receiver portion 38, etc., an instruction input portion 42 for inputting control instructions or a request for communication with another mobile terminal 30 to the control portion 40, a display portion 44 for displaying the input entered via the instruction input portion 42, received call origination information, etc., a call origination information reception notification portion 46 that indicates reception of call origination information by turning on a lamp 48, outputting sounds or speech from a speaker 50, or outputting vibrations from vibrating means 52, etc., a telephone conversation/broadcast audio-visual portion 54 that is connected to a hands-free device 56 comprising an earphone and a microphone, a speaker 58, and/or a microphone 59 for governing speech/sound input and/output.

The first carrier may be of any frequency band. The embodiment uses an ultra-high-frequency band that is higher than about 1 GHz. The second carrier is of a frequency band that is lower than that of the first carrier. The embodiment uses a carrier of a frequency band assigned for broadcasting that is at most 1 GHz and, preferably, at most about 100 MHz.

The telephone call transmitter/receiver portion 34 checks its operating state at intervals set by the control portion 40 on the basis of its operating state, its on-off state, and the state of the broadcasting station carrier receiver portion 38. This check of its operating state comprises determining whether the mobile terminal 30 is "within area," that is, whether the mobile terminal 30 is within a zone in which the mobile terminal 30 can transmit and receive to and from a base station 64 associated with that zone. This is determined by searching for electromagnetic signals from base stations 64. Every time the telephone call transmitter/receiver portion 34 performs a check of its operating state, the telephone call transmitter/receiver portion 34 outputs the results of the operating state check to the control portion 40.

Similar to the telephone call transmitter/receiver portion 34, the broadcasting station carrier receiver portion 38 checks its operating state at intervals set by the control portion 40 on the basis of its operating state, its on-off state, and the state of the telephone call transmitter/receiver portion 34. This check of its operating state comprises determining whether a broadcasting station carrier can be received from a broadcasting station 72, that is, whether the mobile terminal 30 is within an area in which reception of a broadcasting station carrier is possible. The broadcasting station carrier receiver portion 38 likewise outputs the results of the operating state check to the control portion 40 every time it performs a check of its operating state.

The control portion 40 is formed as a microcomputer that has a CPU as a central component. Although not shown in the drawings, the control portion 40 has a ROM that stores processing programs, a RAM that temporarily stores data, an input/output port, etc. The instruction input portion 42 is formed by numerical keys, a plurality of instruction buttons, etc. The instruction buttons include a telephone on-off switch 42a that governs the turning on and off of the telephone call transmitter/receiver portion 34, a broadcasting station carrier receiver on-off switch 42b that governs the turning on and off of the broadcasting station carrier receiver portion 38, etc.

The display portion 44 comprises a graphic controller and a liquid crystal display, although not shown in the drawings. In addition to displaying input entered via the instruction input portion 42 and call origination information received, the display portion 44 displays the on-off state and the transmission/reception state of the telephone call transmitter/receiver portion 34 as well as the on-off state and the reception state of the broadcasting station carrier receiver portion 38, etc. The markings to the left in FIGS. 3A to 3E indicate the on-off state and the transmission/reception state of the telephone call transmitter/receiver portion 34, whereas the markings to the right indicate the on-off state and the transmission/reception state of the broadcasting station carrier receiver portion 38. For example, FIG. 3A indicates that both the telephone call transmitter/receiver portion 34 and the broadcasting station carrier receiver portion 38 are in an on state, and that both are in a state in which transmission and reception are capable. FIG. 3B indicates that the telephone call transmitter/receiver portion 34 is "on" but has lost the first carrier, i.e. is in an operating state in which it is incapable of transmission/reception, and that the broadcasting station carrier receiver portion 38 is "on" and is in an operating state in which it is capable of reception. FIG. 3C indicates that the telephone call transmitter/receiver portion 34 is "off," and that the broadcasting station carrier receiver portion 38 is both "on" and capable of reception. FIG. 3D indicates that the telephone call transmitter/receiver portion 34 is both "on" and capable of transmission/reception, and that the broadcasting station carrier receiver portion 38 is in an "off" state. FIG. 3E indicates that the telephone call transmitter/receiver portion 34 and the broadcasting station carrier receiver portion 38 are both "on" but are both in an operating state in which they are incapable of transmission/reception.

When the mobile terminal 30 receives call origination information, the call origination information notification portion 46 notifies a user thereof by turning on a lamp 48, outputting speech or sounds from the speaker 50, or producing vibrations from the vibration means 52, or by combining two or more of these methods. The method of notification is chosen on the basis of user preferences set using the instruction input portion 42.

The telephone conversation/broadcast audio-visual portion 54 has an audio input processing circuit for converting speech/sounds input via the microphone 59 or the microphone of the hands-free device 56 into audio data, and an audio output circuit for converting audio data into signals that can be output as speech/sounds from the speaker 58 or the speaker of the hands-free device 56. The telephone conversation/broadcast audio-visual portion 54 is designed to allow selection between a telephone conversation using a combination of the speaker 58 and the microphone 59 that is used when the mobile terminal 30 is held by a hand to have a telephone conversation, and a telephone conversation using the hands-free device 56. More specifically, when the hands-free device 56 is connected, the telephone conversation using the hands-free device 56 is selected. When the hands-free device 56 is disconnected, the speaker 58 and the microphone 59 are selected for carrying out the telephone conversation.

As shown in FIG. 1, the telephone call management apparatus 60 comprises a plurality of base stations 64, each of which has a base station antenna 62 capable of transmitting and receiving carriers in the frequency band assigned to the mobile terminals 30 in the zones associated with that respective base station, an exchange station 68 connected to a plurality of fixed telephones 12 via a fixed telephone network 66, an exchange control station 70 that controls transmission/reception performed by the base stations 64 and communication performed by the exchange station 68 via the fixed telephone network, and a broadcasting station 72 having a broadcasting station antenna 74 capable of transmitting a carrier in a frequency band assigned for broadcasting of radio or television signals, etc.

Each zone is defined by the range in which electromagnetic signals transmitted from the base station 64 associated with the zone can be received by mobile terminals 30 and by the range in which electromagnetic signals transmitted from mobile terminals 30 can be received by the base station antenna 62 of the base station 64. Adjacent zones have slight overlaps in some cases, and have no overlap in some other cases. The carrier and frequency band assigned to the mobile terminals 30 is as described above.

The fixed telephone network 66 is a physical, as opposed to wireless, telephone network. The exchange station 68 is an exchange station for connecting the base stations 64 to the fixed telephone network. The exchange station 68 allows telephone calls between the mobile terminals 30 and the fixed telephones 12.

The exchange control station 70 is a station that communicates call-related information or data, e.g. call origination information or audio data, from any one of the base stations 64 to another base station 64 or to the exchange station 68, and that controls the transmission of call origination information via a broadcasting station carrier from the broadcasting station 72. The exchange control station 70 comprises a plurality of computers that have CPUs as central components.

The broadcasting station 72 is a broadcasting station that transmits radio or television broadcasts. Upon request from the exchange control station 70, the broadcasting station 72 superimposes call origination information intended for a mobile terminal 30 onto its radio or television broadcast carrier, i.e. transmits the information using a sideband. The "call origination information" includes an identification number (e.g. the telephone number) of the mobile terminal 30 or the fixed telephone 12 requesting the call, the name of the caller, i.e. the user of the mobile terminal 30 or the fixed telephone 12 requesting the call, and furthermore, a typical message such as "Mr. XX called.", a message input through the mobile terminal 30 or the fixed telephone 12 requesting the call, etc. A broadcasting station 72 is chosen whose broadcasting range covers all of the zones associated with the base stations 64. The broadcasting range of the broadcasting station carrier transmitted from the broadcasting station 72 also extends beyond these zones. Therefore, even if a mobile terminal 30 is not within any of the zones, the mobile terminal 30 can receive the broadcasting station carriers transmitted from the broadcasting station 72 by means of the broadcasting station carrier receiver portion 38 of the mobile terminal 30, provided that the mobile terminal 30 is within the broadcasting range of the broadcast station 72. Likewise, in situations in which the mobile terminal 30 is incapable of transmission/reception via the telephone call transmitter/receiver portion 34 in spite of the mobile terminal 30 being within one of the zones, for example in a situation in which the first carrier has a strong rectilinear propagation characteristic and a building shadows the mobile terminal 30 such that transmission/reception cannot be performed by the telephone call transmitter/receiver portion 34, the mobile terminal 30 can still receive the broadcasting station carriers transmitted from the broadcasting station 72 by means of its broadcasting station carrier receiver portion 38 since the broadcasting station carrier falls within a frequency band that is lower than the frequency band of the first carrier, and thus has a better electromagnetic reflection characteristic.

Operation of the transmitter/receiver system 20 in accordance with the embodiment described above and, in particular, operation of the mobile terminal 30 and operation of the telephone call management apparatus 60 will be described hereinbelow. First, operation of the mobile terminal 30 will be described, and then operation of the telephone call management apparatus 60 will be described.

Figure 4:
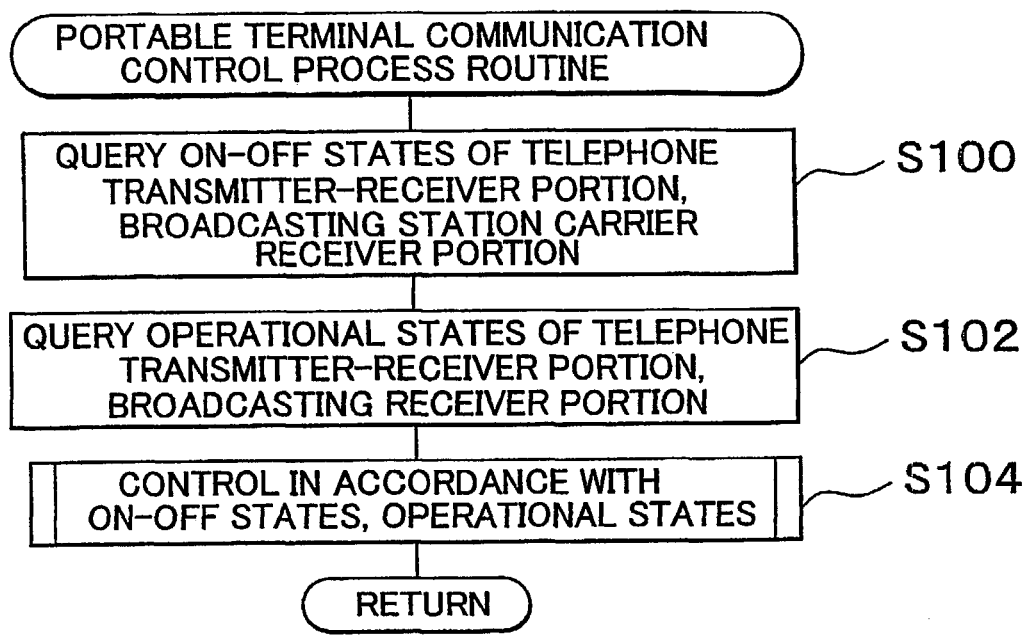
FIG. 4 is a flowchart illustrating an example of a mobile terminal communication control process routine executed by a control portion of a mobile terminal.

FIG. 4 is a flowchart illustrating an example of a mobile terminal communication control process routine executed by the control portion 40 of a mobile terminal 30 as a process relevant to the reception of call origination information. Execution of this routine is repeated at predetermined intervals once the mobile terminal 30 has been powered on, except during telephone calls. When the mobile terminal communication control process routine is executed, the CPU of the control portion 40 first reads (step S100) the on-off states of the telephone call transmitter/receiver portion 34 and the broadcasting station carrier receiver portion 38, and then a process (step S102) of reading the operating states of the telephone call transmitter/receiver portion 34 and the broadcasting station carrier receiver portion 38. The reading of the on-off states of the telephone call transmitter/receiver portion 34 and the broadcasting station carrier receiver portion 38 may be performed by querying predetermined addresses in the RAM of the control portion 40 provided for storing the input from the telephone on-off switch 42a and the broadcasting station carrier receiver on-off switch 42b as on-off states of the telephone call transmitter/receiver portion 34 and the broadcasting station carrier receiver portion 38. The reading of the operating states of the telephone call transmitter/receiver portion 34 and the broadcasting station carrier receiver portion 38 may be performed by querying predetermined addresses in the RAM of the control portion 40 provided for storing the results obtained, as described above, by checking the operating state of the telephone call transmitter/receiver portion 34 and the broadcasting station carrier receiver portion 38, respectively. After thus reading the on-off states and the operating states of the telephone call transmitter/receiver portion 34 and the broadcasting station carrier receiver portion 38, the CPU executes a control process (step S104) whose actions vary in accordance with the aforementioned states, and then ends the routine. The effect the aforementioned states may have on the actions of the control process will be described hereinbelow.

Figure 5:
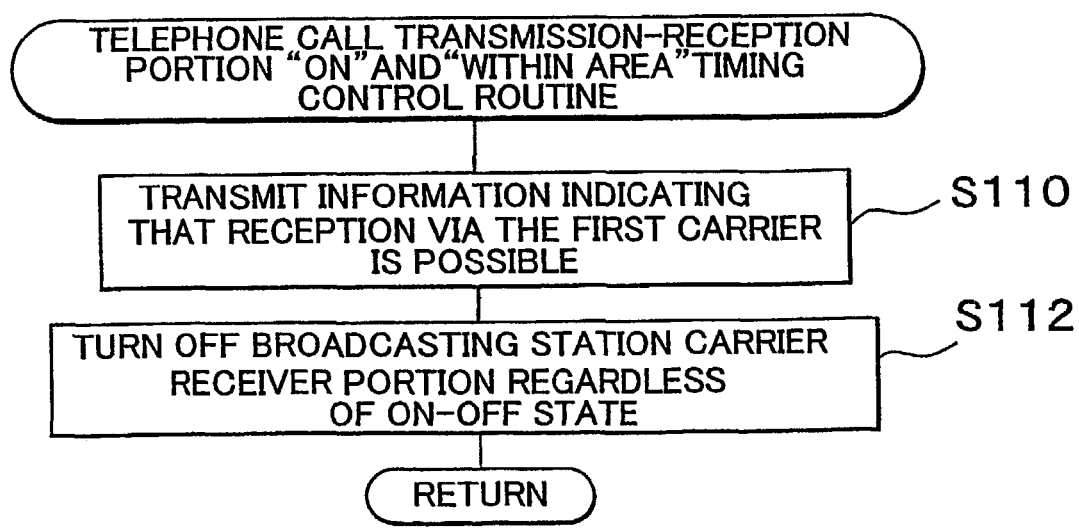
FIG. 5 is a flowchart illustrating an example of a timing control routine that is executed by the control portion of the mobile terminal when the telephone call transmitter/receiver portion is "on" and "within-area."

FIG. 5 is a flowchart illustrating an example of a timing control routine executed by the control portion 40 of the mobile terminal 30 in a situation in which the telephone call transmitter/receiver portion 34 is "on" and "within area," i.e. is capable of transmission/reception. The on-off state and the operating state of the broadcasting station carrier receiver portion 38 is irrelevant. This situation is the situation indicated, for example, in FIGS. 3A and 3D. In such a case, the CPU of the control portion 40 transmits (step S110), via the telephone antenna 32 of the mobile terminal 30, information to the telephone call management apparatus 60 indicating that transmission/reception via the telephone call transmitter/receiver portion 34 is possible together with the ID of the mobile terminal 30, and turns off (step S112) the broadcasting station carrier receiver portion 38 regardless of its on-off state, and then ends this routine. This routine is executed every time the mobile terminal communication control process routine exemplified in FIG. 4 is executed, that is, at predetermined intervals, as long as the telephone call transmitter/receiver portion 34 remains "on" and "within area." In this manner, the telephone call management apparatus 60 receives information at predetermined intervals indicating that transmission/reception via the telephone call transmitter/receiver portion 34 is possible. As long as the telephone call management apparatus 60 receives the ID of the mobile terminal 30 and the information indicating that transmission/reception is possible at predetermined intervals, the telephone call management apparatus 60 knows that the telephone call transmitter/receiver portion 34 of the respective mobile terminal 30 is "within area." When reception of such information discontinues, the telephone call management apparatus 60 is able to recognize that the telephone call transmitter/receiver portion 34 of the respective mobile terminal 30 has gone "out of area" or has been turned off. In step S112, the broadcasting station carrier receiver portion 38 is turned off regardless of its current on-off state, the previous state of the broadcasting station carrier receiver portion 38 is maintained if the broadcasting station carrier receiver portion 38 was previously "off," and the broadcasting station carrier receiver portion 38 is switched off if the broadcasting station carrier receiver portion 38 was previously "on." In the description below, similar expressions will be used to express similar concepts unless otherwise noted.

Figure 6:
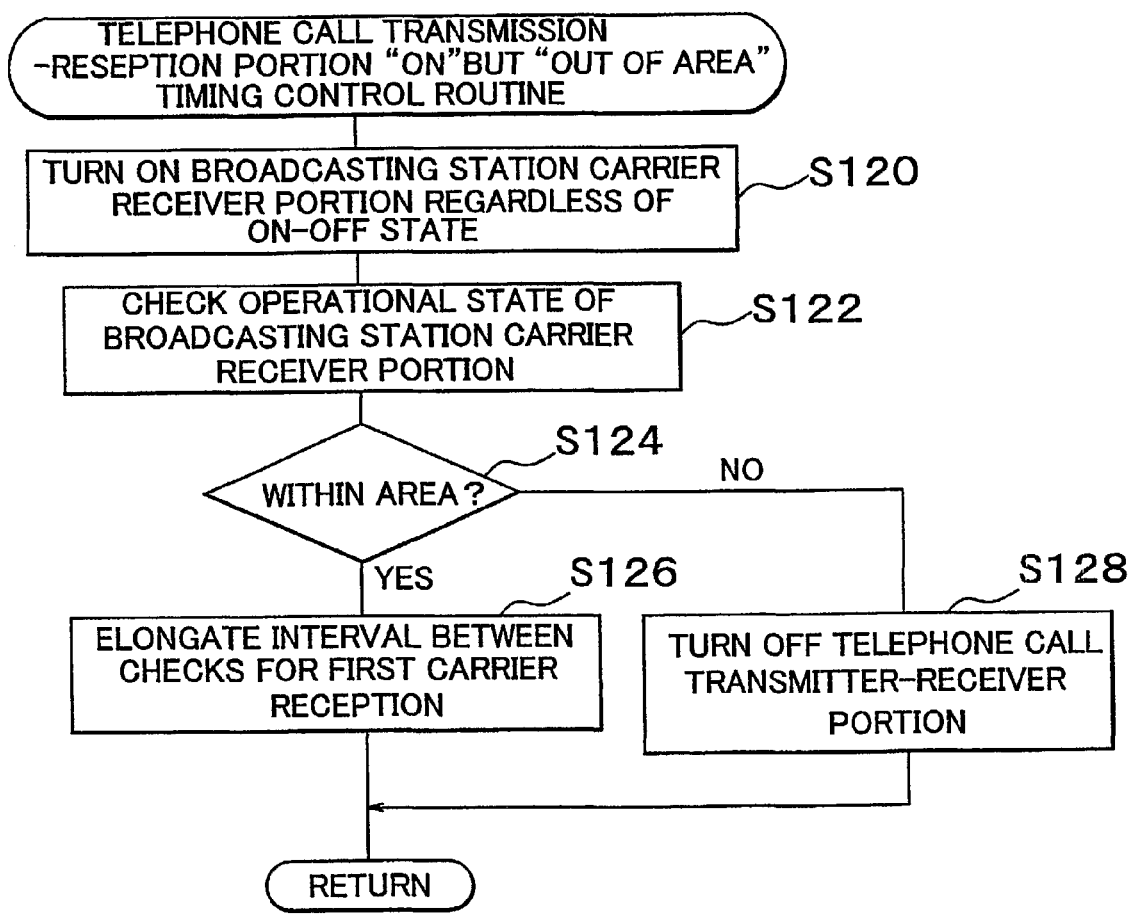
FIG. 6 is a flowchart illustrating an example of a timing control routine that is executed by the control portion of the mobile terminal when the telephone call transmitter/receiver portion is "on" but "out-of-area."

FIG. 6 is a flowchart illustrating an example of a timing control routine that is executed by the control portion 40 of the mobile terminal 30 when the telephone call transmitter/receiver portion 34 is "on" but "out-of-area," i.e. when transmission/reception via the telephone call transmitter/receiver portion 34 is impossible. This situation is the situation indicated, for example, in FIGS. 3B and 3E, and includes the case in which the mobile terminal 30 is incapable of transmission/reception via the first carrier due to interference (jamming). Jamming signals are often intentionally generated to deter use of mobile terminal 30 in consideration of the effects electromagnetic radiation generated by mobile terminal 30 may have on medical equipment. Normally, jamming signals are frequency-swept at a level higher than the control channel of the mobile terminal 30. The mobile terminal 30 is thus able to determine jamming signals by detecting a periodic signal at such a level. For this reason, when the telephone call transmitter/receiver portion 34 is "on" but in an "out-of-area" state, the CPU of the control portion 40 first turns on the broadcasting station carrier receiver portion 38 regardless of the prior on-off state thereof (step S120). This step enables reception of call origination information transmitted from the broadcasting station 72 of the telephone call management apparatus 60 to the mobile terminal 30. Subsequently, the CPU checks the operating state of the broadcasting station carrier receiver portion 38 and determines whether the broadcasting station carrier receiver portion 38 is "within-area," i.e. is capable of receiving the transmission from the base station antenna 62 (steps S122, S124). If the broadcasting station carrier receiver portion 38 is "within-area," the CPU gradually increases the length of the interval between checks of the telephone transmitter/receiver portion's operating state, and then ends the routine. The length of the interval is increased in accordance with the amount of time that has elapsed since this state (step S126) was entered, i.e. since transmission/reception via the first carrier was last possible. For example, the interval between operating state checks may be elongated in a manner of 2 seconds, 5 seconds, 10 seconds, 30 seconds, and 60 seconds after the telephone call transmitter/receiver portion 34 has gone "out-of-area." In such a modus operandi, the CPU may sometimes deem the telephone call transmitter/receiver portion 34 to be "out-of-area" although the mobile terminal 30 was, in fact, within a zone for a while. This is due to the fact that the telephone call transmitter/receiver portion 34 may switch to the "within-area" state and back to the "out-of-area" state during the long intervals in which no operating state checks occur. However, since the mobile terminal 30 of this embodiment is able to receive call origination information by means of the broadcasting station carrier receiver portion 38, the aforementioned cases do not pose a problem in terms of reception. Furthermore, the elongation of the interval between operating state checks reduces the power consumed by the mobile terminal 30. Conversely, if it is determined in step S124 that the broadcasting station carrier receiver portion 38 is "out-of-area," the CPU turns off (step S128) the telephone call transmitter/receiver portion 34, and then ends the routine. Turning off the telephone call transmitter/receiver portion 34 is sensible since a check of its operating state would be a pointless venture in view of the fact that the reception area of the telephone call transmitter/receiver portion 34 is smaller than that of the broadcasting station carrier receiver portion 38. Checking of the broadcasting station carrier receiver portion's operating state is executed at predetermined intervals.

Figure 7:
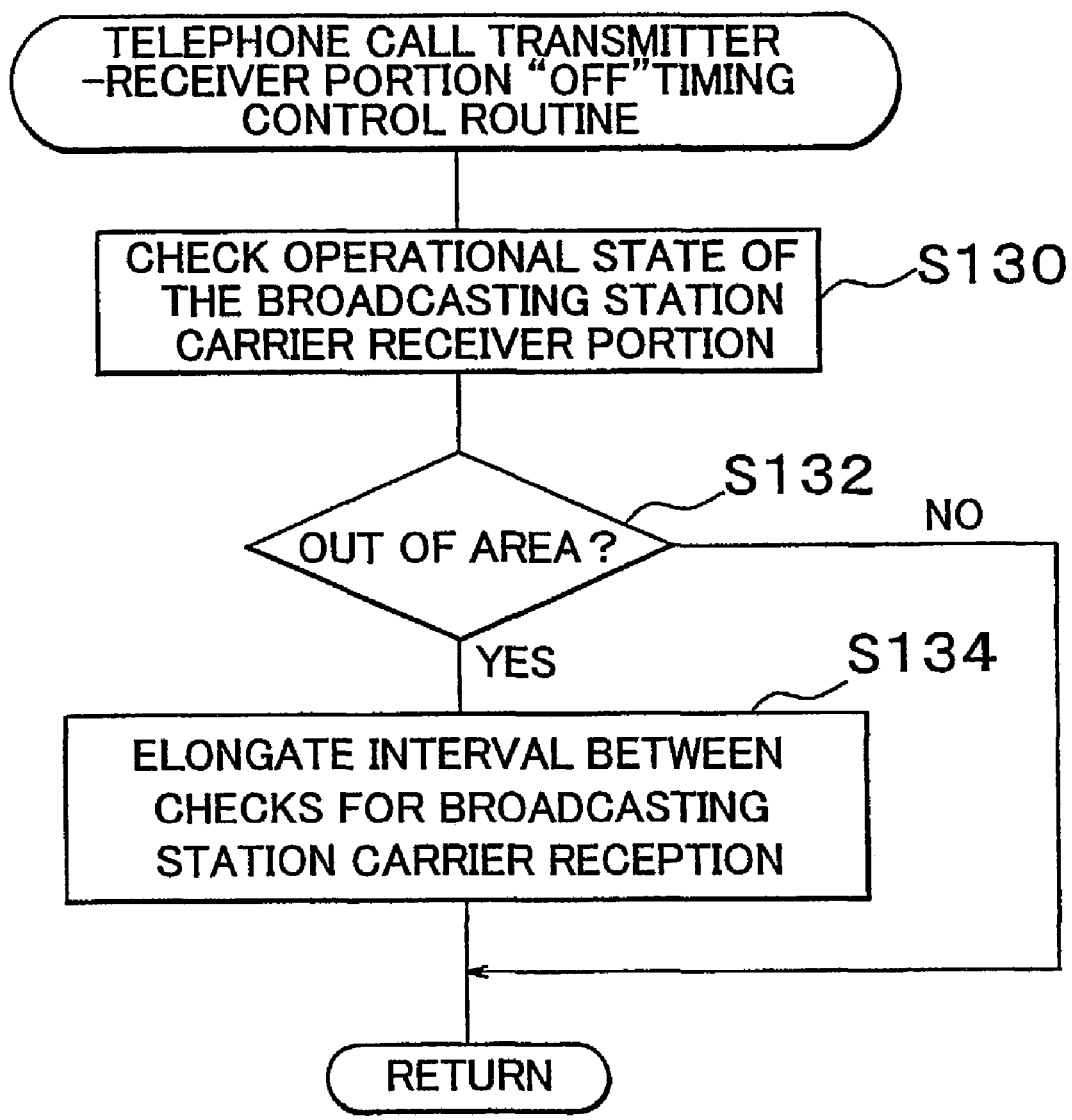
FIG. 7 is a flowchart illustrating an example of a timing control routine that is executed by the control portion of the mobile terminal when the telephone call transmitter/receiver portion is "off" and the broadcasting station carrier receiver portion is "on."

FIG. 7 is a flowchart illustrating an example of a timing control routine that is executed by the control portion 40 of the mobile terminal 30 when the telephone call transmitter/receiver portion 34 is "off" and the broadcasting station carrier receiver portion 38 is "on." This situation is the situation indicated, for example, in FIG. 3C. In such a situation, the CPU of the control portion 40 first checks the operating state of the broadcasting station carrier receiver portion 38, and determines whether the broadcasting station carrier receiver portion 38 is "within-area" (steps S130, S132). If the broadcasting station carrier receiver portion 38 is "out-of-area," the CPU gradually elongates the interval between checks by the broadcasting station carrier receiver portion 38 of its operating state, and then ends the routine. The length of the interval is increased in accordance with the amount of time that has elapsed since the aforementioned state (step S134) was entered, i.e. since transmission/reception via the second carrier was last possible. For example, the interval between operating state checks is gradually elongated in a manner of 2 seconds, 5 seconds, 10 seconds, 30 seconds, and 60 seconds immediately after the broadcasting station carrier receiver portion 38 has gone "out-of-area." However, it is preferred that once the interval has reached a predetermined length, the interval be maintained. This is because the mobile terminal 30 has no other means for receiving call origination information. Elongating the interval between checks of the broadcasting station carrier receiver portion's operating state in this manner reduces the power consumed by the mobile terminal 30. Conversely, if it is determined in step S132 that the broadcasting station carrier receiver portion 38 is "within-area," the CPU ends the routine without taking any further steps.

Figure 8:
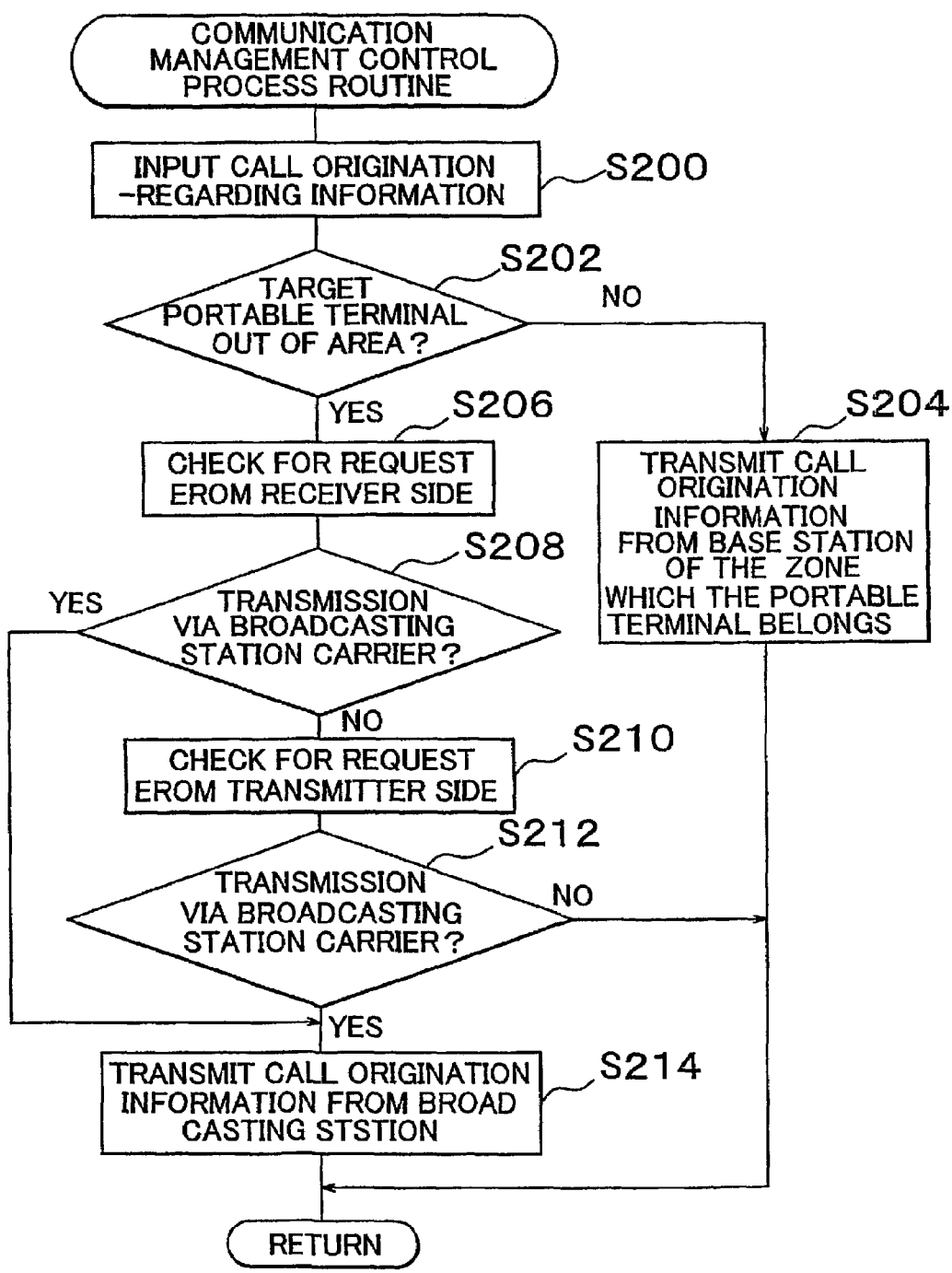
FIG. 8 is a flowchart illustrating an example of a telephone call management control process routine that is executed by an exchange control station of a telephone call management apparatus.

FIG. 8 is a flowchart illustrating an example of a telephone call management control process routine that is executed by the exchange control station 70 of the telephone call management apparatus 60 in the transmitter/receiver system 20 of the preferred embodiment. This routine is executed upon input of a request for a call from a mobile terminal 30 or a fixed telephone 12 to another mobile terminal 30. When the telephone call management control process routine is executed, the CPU of the exchange control station 70 first reads call origination information that includes an identification number (telephone number) of the target mobile terminal 30, an identification number (telephone number) of the mobile terminal 30 or the fixed telephone 12 requesting the call, the name of a user thereof, and the like (step S200). Subsequently, the CPU determines whether the telephone call transmitter/receiver portion 34 of the target mobile terminal 30 is "within-area," i.e. is capable of transmission/reception (step S202). If the telephone call transmitter/receiver portion 34 of the mobile terminal 30 is capable of transmission/reception, information indicating that transmission/reception is possible is transmitted to the telephone call management apparatus 60 in step S110 of the timing control routine exemplified in FIG. 5. Therefore, the aforementioned determination can be accomplished by checking whether information indicating that transmission/reception is possible is periodically received.

If the telephone call transmitter/receiver portion 34 of the target mobile terminal 30 is "within-area," the call origination information is transmitted from the base station 64 of the zone in which the mobile terminal 30 is located (step S204). The routine is then ended. The target mobile terminal 30, if its telephone call transmitter/receiver portion 34 is "within-area," receives the call origination information transmitted from the base station 64. The mobile terminal 30 then notifies the user of the call origination information via the call origination information notification portion 46, for example, by turning on the lamp 48, outputting speech or sounds from the speaker 50, or by vibrating via vibrating means 52.

Conversely, if the telephone call transmitter/receiver portion 34 of the target mobile terminal 30 is "out-of-area," the CPU of the exchange control station 70 checks whether the target mobile terminal 30 has made a request for transmission of call origination information (request from the receiver side) via the broadcasting station carrier (steps S206, S208). The mobile terminal 30 makes this request in response to user input via the instruction input portion 42 when the telephone call transmitter/receiver portion 34 of the mobile terminal 30 is in a within-area state by transmitting information indicating that it would like call origination information to be transmitted via the broadcasting station carrier. The mobile terminal 30 cancels this request in response to user input via the instruction input portion 42 when the telephone call transmitter/receiver portion 34 of the mobile terminal 30 is "within-area" by transmitting information indicating that the mobile terminal 30 would like to cancel its request for transmission of call origination information via the broadcasting station carrier. The transmission of call origination information via the broadcasting station carrier may incur additional costs as compared to a conventional mobile telephone system, and may therefore be a separately billed service. If the target mobile terminal 30 has made a request for transmission of call origination information via the broadcasting station carrier, the CPU transmits call origination information via the broadcasting station 72 (step S214), and then ends the routine. In such an embodiment, the transmission of call origination information from the broadcasting station 72 is performed a plurality of times (e.g., three times) at predetermined intervals (e.g., one-minute intervals) when traffic is low. When traffic is high, transmission is performed a plurality of times at longer intervals in accordance with traffic. The purpose of transmitting call origination information a plurality of times is to increase the probability that the call origination information is received by the target mobile terminal 30. Furthermore, transmission at predetermined intervals further increases the probability of reception of the call origination information by the target mobile terminal 30 in comparison with a plurality of back-to-back transmissions. Still further, changing the transmission interval in accordance with the traffic load allows equitable sharing of available bandwidth.

If the target mobile terminal 30 has not made a request for transmission of call origination information via the broadcasting station carrier, the CPU queries the mobile terminal 30 or the fixed telephone 12 that has requested the call as to whether or not such transmission of call origination information (request from the transmitter side) (steps S210, 212) should be requested. Typically, this query entails two steps. First, information indicating that the target mobile terminal 30 is "out-of-area" is transmitted to the mobile terminal 30 or the fixed telephone 12 requesting the call. Then, a message such as "Do you request transmission of caller information via the broadcasting station carrier? If you do, press. #1. If you do not, press #2." is sent to the mobile terminal 30 or the fixed telephone 12 requesting the call so as to allow the caller, i.e. the user of the call-requesting mobile terminal 30 or fixed telephone 12 requesting the call, to express his preference. If the mobile terminal 30 or fixed telephone 12 requesting the call requests transmission of the call origination information via the broadcasting station carrier, the CPU transmits the call origination information via the broadcasting station 72 (step S214), and then ends the routine. If the mobile terminal 30 or fixed telephone 12 requesting the call does not request transmission of the call origination information via the broadcasting station carrier, the CPU ends the routine without transmitting the call origination information via the broadcasting station 72. The transmission of call origination information via the broadcasting station carrier upon a caller's request may be a separately billed service, similar to transmission via the broadcasting station carrier upon request from the receiving side.

In accordance with the embodiment of a transmitter/receiver system 20 described above, the mobile terminal 30 has a broadcasting station carrier receiver portion 38 capable of receiving a broadcasting station carrier of a frequency band that is lower than that of the telephone carrier, and the telephone call management apparatus 60 transmits call origination information via said broadcasting station carrier when predetermined conditions are met. Thus, call origination information can be received by the broadcasting station carrier receiver portion 38 even when the telephone call transmitter/receiver portion 34 of the mobile terminal 30 cannot perform transmission/reception. The is the case, for example, when the mobile terminal 30 is beyond a reception zone, or is within a reception zone but cannot perform transmission/reception due to shadowing by a building, when transmission/reception is inhibited by a jamming signal generated in a hospital or the like, or when a user has been prompted, in a movie theater, an amusement park, etc., to turn off his telephone and has therefore set the telephone transmitter/receiver portion 34 to an off state, etc. The invention thus allows a user to be reached in an emergency.

Furthermore, in accordance with the mobile terminal 30 constituting the transmitter/receiver system 20 of the embodiment, it is possible to receive call origination information with a high probability by controlling the telephone call transmitter/receiver portion 34 and the broadcasting station carrier receiver portion 38 in accordance with the on-off state and the operating state of the telephone call transmitter/receiver portion 34 and the on-off state and the operating state of the broadcasting station carrier receiver portion 38. Likewise, it is also possible to thus conserve electricity. That is, if the telephone call transmitter/receiver portion 34 is in both an "on" state and in a transmission/reception capable state, the broadcasting station carrier receiver portion 38 is set to an "off" state regardless of its present on-off state, so as to conserve power while maintaining reliable reception. If the telephone call transmitter/receiver portion 34 is in an "on" state but is in a transmission/reception incapable state, the broadcasting station carrier receiver portion 38 is set to an "on" state regardless of its present on-off state, so as to allow reliable reception. At the same time, the interval between checks of the telephone call transmitter/receiver portion's operating state is elongated or the execution of such operating state checks is stopped so as to achieve power conservation. If the telephone call transmitter/receiver portion 34 is in an "off" state and the broadcasting station carrier receiver portion 38 is in an "on" state but is incapable of reception, the interval between checks of the broadcasting station carrier receiver portion's operating state is elongated so as to achieve power conservation.

In accordance with the telephone call management apparatus 60 constituting the transmitter/receiver system 20 of the embodiment, transmission of call origination information via the broadcasting station carrier is performed solely when the telephone call transmitter/receiver portion 34 of the target mobile terminal 30 is "out-of-area." Moreover, transmission of call origination information via the broadcasting station carrier is performed upon request from the receiver side or the transmitter side. Therefore, unnecessary transmissions via the broadcasting station carrier can be reduced.

In accordance with the transmitter/receiver system 20 of the embodiment, if the telephone call transmitter/receiver portion 34 of a mobile terminal 30 is both "on" and capable of transmission/reception, the broadcasting station carrier receiver portion 38 is turned off regardless of its current on-off state. Nonetheless, embodiments are conceivable in which the broadcasting station carrier receiver portion 38 is not turned off in the aforementioned case. Furthermore, according to the transmitter/receiver system 20 of the embodiment, if the telephone call transmitter/receiver portion 34 of the mobile terminal 30 is "on" but is incapable of transmission/reception, the broadcasting station carrier receiver portion 38 is turned on regardless of its current on-off state. Nonetheless, embodiments are conceivable in which the broadcasting station carrier receiver portion 38 is not turned on in the aforementioned case. Still further, according to the transmitter/receiver system 20 of the embodiment, if the telephone call transmitter/receiver portion 34 of a mobile terminal 30 is "on" state but is incapable transmission/reception, the broadcasting station carrier receiver portion 38 is turned on regardless of its on-off state, and the interval between checks of the telephone call transmitter/receiver portion's operating state is elongated or such checks are stopped. Nonetheless, embodiments are conceivable in which the interval of such operating state checks is not altered. Further, according to the transmitter/receiver system 20 of the embodiment, if the telephone call transmitter/receiver portion 34 of a transmitter/receiver system 20 is "off" and the broadcasting station carrier receiver portion 38 is "on" but incapable of reception, the interval in which the operating state of the broadcasting station carrier receiver portion 38 is checked is elongated. Nonetheless, embodiments are conceivable in which the interval between operating state checks of the broadcasting station carrier receiver portion 38 is not elongated.

Furthermore, in accordance with the transmitter/receiver system 20 of the embodiment, the telephone call management apparatus 60 performs transmission of call origination information via a broadcasting station carrier solely if the telephone call transmitter/receiver portion 34 of a target mobile terminal 30 is "out-of-area." However, it is also possible to adopt an embodiment in which the telephone call management apparatus 60 performs transmission of call origination information via the broadcasting station carrier when reception of the call origination information cannot be confirmed although the telephone call transmitter/receiver portion 34 is "within-area" and communication has been attempted a predetermined number of times. Likewise, embodiments are conceivable in which the telephone call management apparatus 60 performs transmission of call origination information via the broadcasting station carrier regardless of the operating state of the telephone call transmitter/receiver portion 34. In such a case, in the transmitter/receiver system 20 of the embodiment, transmission of call origination information via the broadcasting station carrier is performed upon request from the receiver side or upon request from the transmitter side. Nonetheless, embodiments are conceivable in which transmission of call origination information via the broadcasting station carrier is performed only upon request from the receiver (target) side, or in which transmission of call origination information via the broadcasting station carrier is performed only upon request from the transmitter (caller) side, or in which transmission of call origination information via the broadcasting station carrier is performed independent of a request from the receiver side the transmitter side.

Although, in the transmitter/receiver system 20 of the embodiment, a mobile terminal 30 transmits information to the telephone call management apparatus 60 as to whether the telephone call transmitter/receiver portion 34 is capable of transmission/reception, embodiments are conceivable in which the mobile terminal 30 does not transmit information regarding the operating state of the telephone call transmitter/receiver portion 34 to the telephone call management apparatus 60. With such an embodiment, there may be some cases in which the telephone call management apparatus 60 cannot determine whether or not the telephone call transmitter/receiver portion 34 of a target mobile terminal 30 is currently capable of transmission/reception. Accordingly, the telephone call management apparatus 60 may perform transmission of call origination/information via the broadcasting station carrier when the telephone call management apparatus 60 cannot confirm reception of call origination information that has been transmitted to the telephone call transmitter/receiver portion 34 of the target mobile terminal 30 via the base station 64 a predetermined number of times.

In the above description of the transmitter/receiver system 20 of the embodiment, each mobile terminal 30 is merely a speech communication device, e.g. a telephone or the like. However, since each mobile terminal 30 is equipped with a broadcasting station carrier receiver portion 38 for receiving a broadcasting station carrier, a mobile terminal 30 may also be designed for use as a radio or television apparatus.

In the transmitter/receiver system 20 of the embodiment, call origination information is transmitted from the broadcasting station 72 of the telephone call management apparatus 60 via a broadcasting station carrier, and call origination information transmitted via a broadcasting station carrier is received by the broadcasting station carrier receiver portion 38 of a mobile terminal 30. However, the carrier used for transmission and reception of call origination information is not limited to the broadcasting station carrier but may be of any frequency band as long as the carrier of a frequency band having a satisfactorily high electromagnetic reflection characteristic and covering a broad area.

Although in the transmitter/receiver system 20 of the embodiment, the transmission of call origination information from the broadcasting station 72 of the telephone call management apparatus 60 is performed a plurality of times at predetermined intervals or at intervals that are varied in accordance with carrier traffic, it is also possible to adopt an embodiment in which call origination information is transmitted back-to-back a plurality of times, or in which call origination information is transmitted only once.

Figure 9:
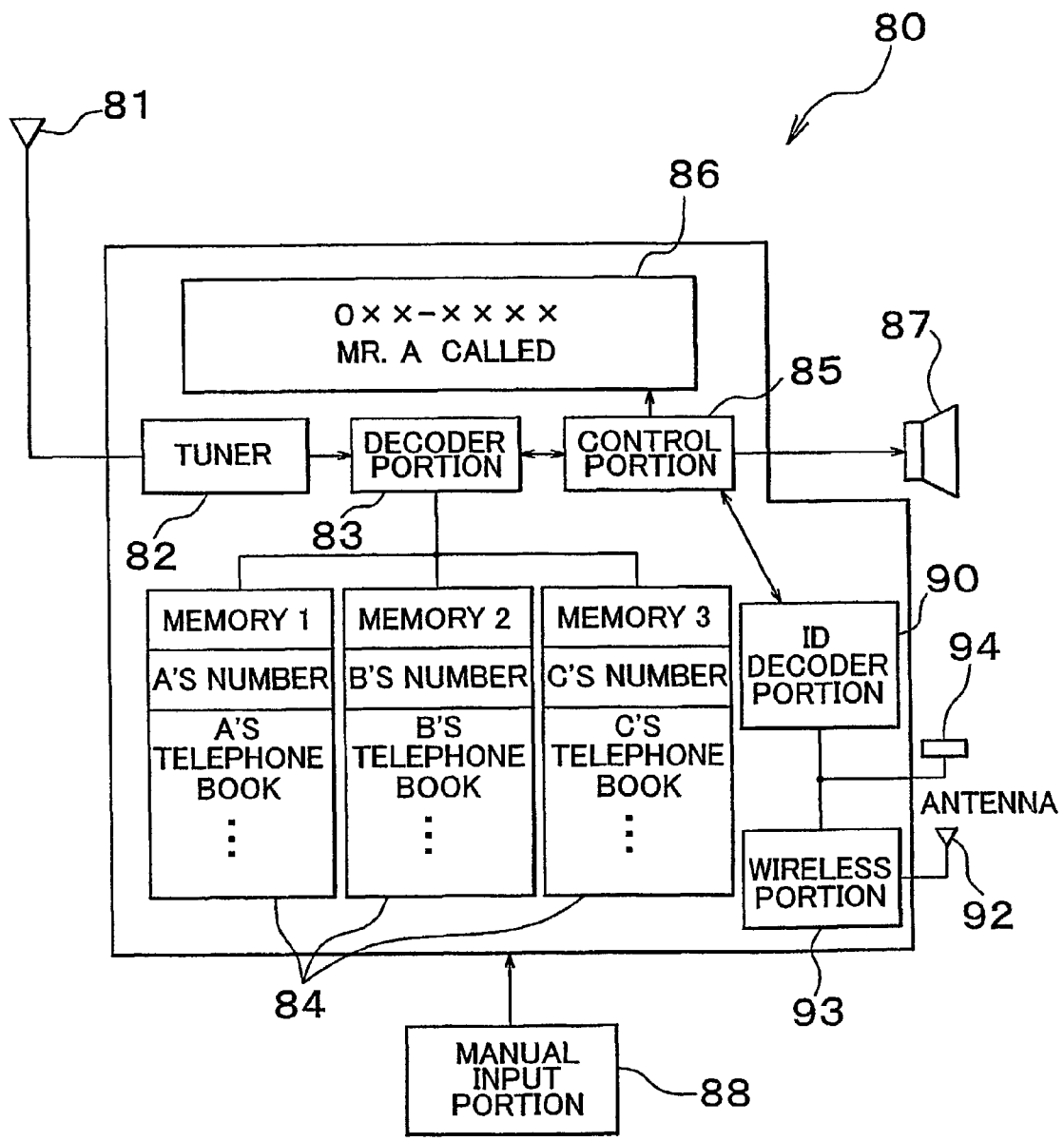
FIG. 9 is a schematic diagram illustrating a vehicle-installed radio receiver apparatus in accordance with an embodiment of the invention.

Although in the transmitter/receiver system 20 of the embodiment, the call origination information transmitted from the broadcasting station 72 is received by the broadcasting station carrier receiver portion 38 of a mobile terminal 30, embodiments are also possible in which call origination information is received by an apparatus capable of receiving broadcasting station carriers. As an example of such an apparatus, a vehicle-installed radio receiver apparatus 80 is schematically illustrated in FIG. 9. The implementation and operation of an embodiment employing the vehicle-installed radio receiver apparatus 80 will be described below.

The vehicle-installed radio receiver apparatus 80 of the embodiment preferably comprises an antenna 81 capable of receiving broadcasting station carriers, a tuner 82 that can tune to the broadcasting station carriers received by the antenna 81, a decoder portion 83 that deciphers whether call origination information obtained via the broadcasting station carriers is information associated with a number that is designated and stored among a plurality of areas in a memory 84, a control portion 85 comprising a microcomputer for controlling the entire apparatus, a display portion 86 that displays a portion of the call origination information in the form of characters, a speaker 87 that produces audio output of a portion of the call origination information, a manual input portion 88 for changing, adding to and deleting contents of the memory 84 and for inputting instructions to the control portion 85, and an ID decoder portion 90 that decodes ID information from a mobile terminal 30 connected to the apparatus via a physical or wireless link via a connection terminal 94 or an antenna 92 and a wireless portion 93, respectively.

Next, operation of the above embodiment of a vehicle-installed radio receiver apparatus 80 will be described. In particular, the setting and registering of numbers associated with an object, i.e. target data, e.g. the telephone number or ID associated with a portable terminal 30, as well as the operations performed when call origination information is received via a broadcasting station carrier, will be described.

Figure 10:
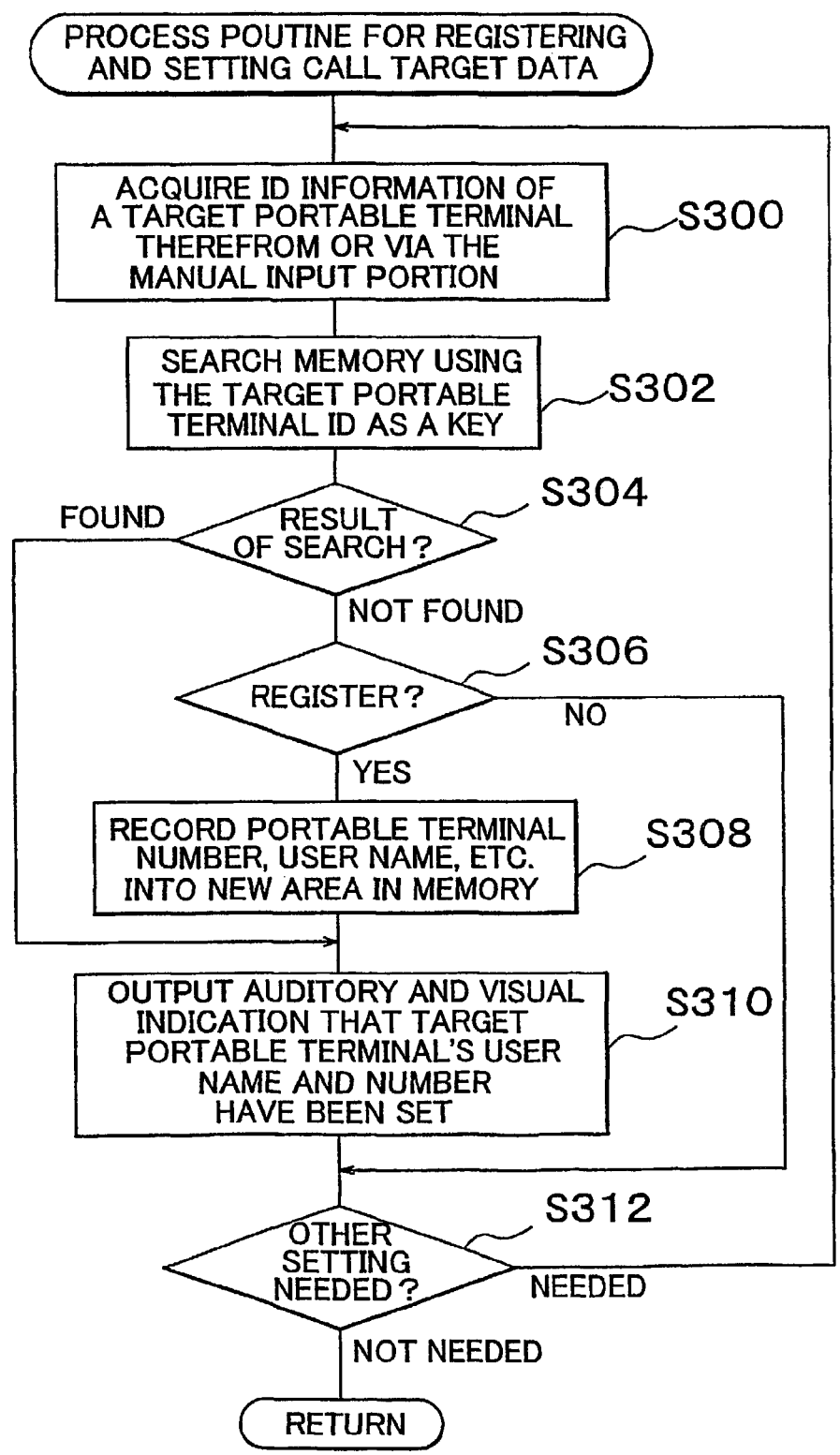
FIG. 10 is a flowchart illustrating an example of a processing routine for setting target data in the memory of a vehicle-installed radio receiver apparatus in accordance with an embodiment of the invention.

The setting and registration of target data, e.g. the storage of target data in the form of personalized, electronic telephone books created in the memory 84 of a mobile terminal 30, is performed by executing a processing routine as exemplified in FIG. 10. This routine is executed when the target data setting process is initiated through the mobile terminal 30 or the manual input portion 88. When the processing routine is executed, the control portion 85 first acquires the ID of a mobile terminal 30 that is to be a target object from the mobile terminal 30 itself or via the manual input portion 88 (step S300). Acquisition of the ID from the mobile terminal 30 itself can be accomplished via a direct physical or wireless communication link established by hooking up to the mobile terminal 30 either via the connection terminal 94 or via the wireless portion 93 and the antenna 92. Acquisition of the mobile terminal's ID through the manual input portion 88 is based upon user input.

After acquiring the ID of the target mobile terminal 30, the control portion 85 searches the memory 84 for the presence of data that includes the ID by using the acquired ID as a key (step S302). The data stored in various areas in the memory 84 is made up of the IDs and numbers of mobile terminals 30, user's names, telephone books, etc. If data that includes the acquired ID is found, the control portion 85 displays an output in the display portion 86 and produces an audio output from the speaker 87 so as to notify the user that the name and the number associated with the acquired data have been set as a target, for example, "The number 123-4567 of Mr. XX has been set as a target." (step S310). Then, the control portion 85 queries the user as to whether he would like to acquire further target data (step S312). Specifically, the user is queried by producing an audio output from the speaker 87 or displaying an output in the display portion 86, e.g.: "Do you wish to acquire another target? To acquire, press #1. To abort, press #2.". If further target data is to be acquired, the control portion 85 returns to step S300. If the user chooses to discontinue target data acquisition, the control portion 85 ends the routine.

If the data is not found in step S304, the control portion 85 queries the user as to whether the newly acquired target data should be registered, i.e. stored, in memory 84 (step S306). In particular, the user is queried by displaying an output in the display portion 86 or by producing an audio output via the speaker 87 such as "No information regarding this mobile terminal is stored. Do you wish to register this information? To register, press #1. To abort, press #2." If the information is to be registered, the control portion 85 writes the ID and number of the mobile terminal 30, the user's name, etc., into free areas in memory 84 (step S308) and then executes the setting process that starts in step S310. If no information is to be registered, the control portion 85 skips the setting steps, whose execution would be superfluous, and instead proceeds directly to step S312.

By executing the processing routine as described above, it is possible to select a target mobile terminal 30 to be called via the vehicle-installed radio receiver apparatus 80 on the basis of target data stored in memory 84.

Figure 11:
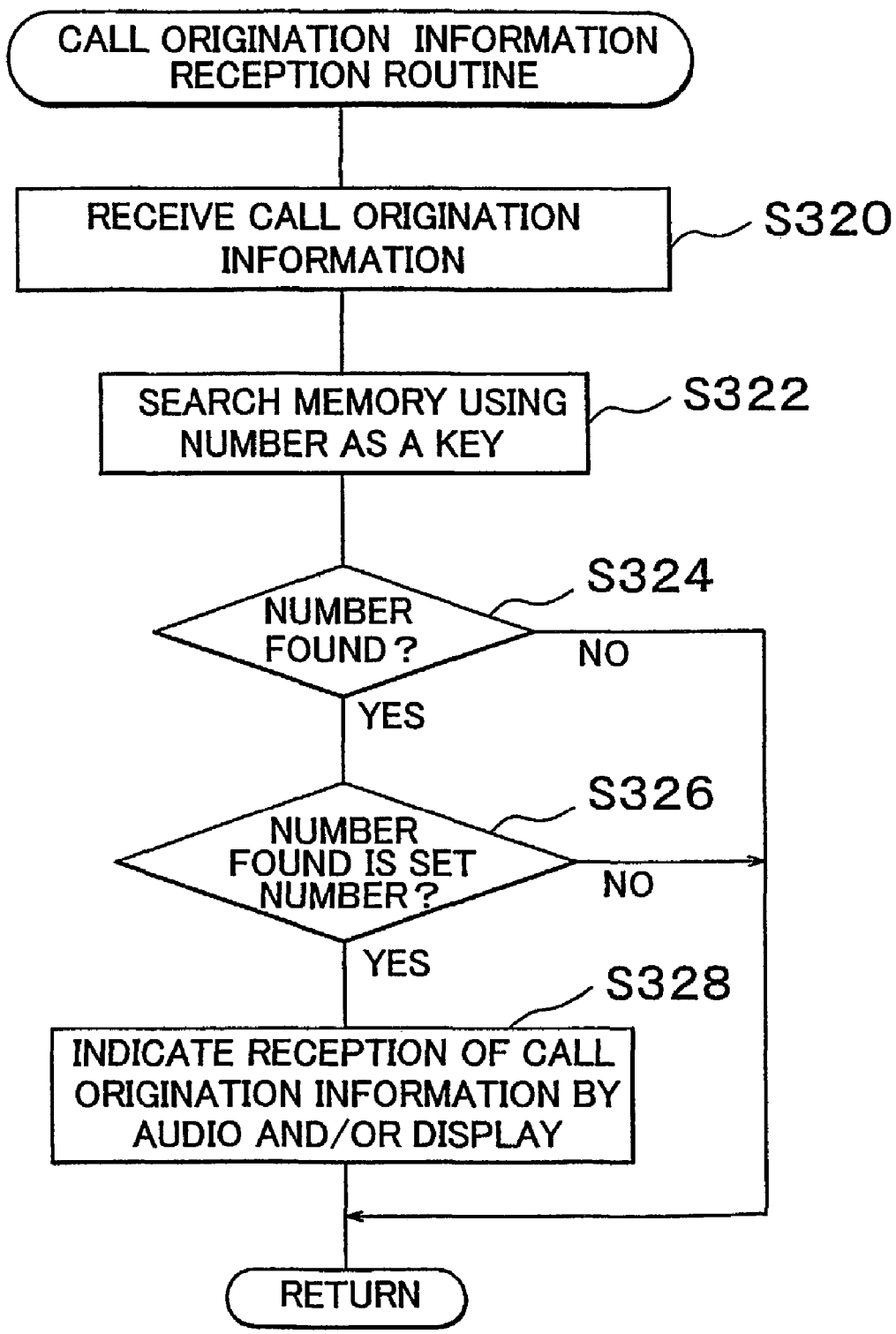
FIG. 11 is a flowchart illustrating an example of a call origination information reception routine that is executed by a control portion of the vehicle-installed radio receiver apparatus in accordance with an embodiment of the invention.

The operations performed when the vehicle-installed radio receiver apparatus 80 of the embodiment receives call origination information are exemplified by the processing routine illustrated in FIG. 11. In this process routine, first, call origination information is received by the antenna 81 (step S320). Then, the memory 84 is searched to find out whether data that includes the number of the target object is stored in the memory 84 by using, as a key, the target object number included in the call origination information received (steps S322, S324). If data including the number is found in memory 84, the apparatus determines whether the target data stored in association-with the number is currently active (step S326), i.e. has been set as target data as described above. (It is to be noted that user-dependent target data may become active/inactive depending on the current user of the apparatus 80.) If the number is associated with presently active target data, receipt of the call origination information is indicated by speech/sound and/or display (step S328). The processing routine is then ended. The notification of received call origination data is performed by producing a visual output in the display portion 86 and producing an audio output from the speaker 87, for example, "Mr. XX. called.", and/or by also displaying the caller's number in the display portion 86. Once notified of the receipt of call origination information by the vehicle-installed radio receiver apparatus 80, a user can stop his vehicle, and can use the vehicle-installed radio receiver apparatus 80, a public telephone, etc. to contact the caller.

If data that includes the number concerned is not found in the memory 84 in step S324, or if data that includes the number is found but the target data associated with the number is not presently active (step S326), the routine ends without notifying the user of the call origination information received.

The above-described vehicle-installed radio receiver apparatus 80 of the embodiment receives call origination information transmitted via a broadcasting station carrier, and then outputs information indicating that there was a call. Therefore, a user can know that there was a call, even if the mobile terminal 30 has been powered off. Furthermore, according to the vehicle-installed radio receiver apparatus 80 of the embodiment, it is possible to input target data respectively relating to a plurality of mobile terminals 30 into the memory 84 and to later select a target object on the basis of the stored target data. Thus, the vehicle-installed radio receiver apparatus 80 can be shared by a plurality of persons. Still further, it is possible to input target data regarding a mobile terminal 30 or to select a target object via a mobile terminal 30 connected to the apparatus 80 via a physical or wireless link. Therefore, input and selection can be easily accomplished.

The vehicle-installed radio receiver apparatus 80 of the embodiment acquires an ID from a mobile terminal 30 connected thereto via a physical or wireless link using the connection terminal 94 or the antenna 92 and the wireless portion 93, respectively, and selects a target object. However, it is also possible to adopt a embodiment in which the mobile terminal 30 comprises electronic key means for providing the mobile terminal 30 with the capabilities of an electronic key, such as locking doors, unlocking doors, starting the engine, etc. In such an embodiment, it is preferably that, when a door is unlocked or the engine is started through the use of the mobile terminal 30, the ID of the mobile terminal 30 is acquired from a memory of a wireless key system or of a immobilize system, and that the target objects corresponding to the key are automatically set, i,e, activated. In this embodiment, a transponder chip, a chip for a smart key (automatic matching) or the like that are normally built in an electronic key may be built into the mobile terminal 30. Therefore, even if information regarding a plurality of users is stored in the memory 84 of the vehicle-installed radio receiver apparatus 80 of the embodiment, only information that matches the ID of the key-like mobile terminal is selected and made available, thereby achieving privacy protection.

Although the invention is described above with respect to an embodiment as a vehicle-installed radio receiver apparatus 80, the broadcasting station carrier receiver apparatus of the invention may be likewise applied to a vehicle-installed television apparatus, or to a radio receiver apparatus or a television apparatus that is not installed in a vehicle.

In accordance with the vehicle-installed radio receiver apparatus 80 of the above embodiment, data relating to mobile terminals 30 is stored in the memory 84. The telephone call management apparatus 60 transmits call origination information to a mobile terminal 30 via a broadcasting station carrier. However, it is also possible to adopt an embodiment in which the vehicle-installed radio receiver apparatus 80 also stores data regarding fixed telephones 12 in its memory 84, and in which the telephone call management apparatus 60 transmits call origination information with respect to the fixed telephones 12 via the broadcasting station carrier. In this case, it is also possible to adopt an embodiment in which the telephone call management apparatus 60 may receive requests for transmission of call origination information from fixed telephones 12, or in which the telephone call management apparatus 60 transmits call origination information with respect to a fixed telephone 12 via the broadcasting station carrier when the telephone call management apparatus 60 cannot confirm call completion despite having called the fixed telephone 12 a predetermined number of times. In this manner, a user can be notified of a call to a fixed telephone 12 via the vehicle-installed radio receiver apparatus 80.

Although the transmitter/receiver system 20 and the vehicle-installed radio receiver apparatus 80 of the embodiments are described above with reference to an example telephone system that includes mobile telephones and fixed telephones, the transmitter/receiver system 20 and the vehicle-installed radio receiver apparatus 80 are not limited to such a telephone system, but are applicable to any communication system.

While forms of carrying out the invention have been described through the use of the embodiments, it should be apparent that the invention is not restricted at all by the foregoing embodiments, but may be carried out in various forms within a range that does not depart from the gist of the invention.

The invention claimed is:

1. A transmitter/receiver system comprising:
   one or more mobile transmitter/receiver apparatus comprising:
   a telephone call transmission/reception device that transmits and receives respective audio data via a first carrier of a first frequency band and that receives respective first call origination information via said first carrier; and
   a call origination information reception device that receives respective second call origination information via a second carrier of a second frequency band that is lower than said first frequency band; and
   a transmission/reception management apparatus that manages transmission to and reception from at least one of said one or more mobile transmitter/receiver apparatus, said transmission/reception management apparatus comprising:
   a telephone call management apparatus that governs an exchange, employing said first carrier, of said respective audio data between said at least one of said one or more mobile transmitter/receiver apparatus and at least one other mobile transmitter/receiver apparatus and a communication apparatus connected to said transmission/reception management apparatus;
   a first call information transmission apparatus that transmits, when a call is made to any one of said one or more mobile transmitter/receiver apparatus, said respective first call origination information via said first carrier; and
   a second call information transmission apparatus that transmits, when a call is made to said any one of said one or more mobile transmitter/receiver apparatus, said respective second call origination information via said second carrier.

2. The transmitter/receiver system according to claim 1, wherein said second carrier has a frequency of at most 1 GHz.

3. The transmitter/receiver system according to claim 1, wherein said second carrier is a broadcasting station carrier as used for radio or television broadcasting.

4. The transmitter/receiver system according to claim 3, wherein said second carrier is a sideband of said broadcasting station carrier of an area in which said one or more mobile transmitter/receiver apparatus is being used.

5. The transmitter/receiver system according to claim 3, wherein said second call information transmission apparatus transmits said respective second call origination information by superimposing said respective second call origination information on said broadcasting station carrier.

6. The transmitter/receiver system according to claim 1, wherein said second call information transmission apparatus transmits said respective second call origination information a plurality of times.

7. The transmitter/receiver system according to claim 6, wherein the second call information transmission apparatus transmits said respective second call origination information a plurality of times at predetermined intervals.

8. The transmitter/receiver system according to claim 6, wherein the second call information transmission apparatus transmits said respective second call origination information a plurality of times at intervals that are changeable in accordance with call or carrier traffic.

9. The transmitter/receiver system according to claim 1, said one or more mobile transmitter/receiver apparatus further comprising a first transmission on-off controller that transmits, to said transmission/reception management apparatus, information as to whether the transmission/reception management apparatus should transmit said respective second call origination information to said one or more mobile transmitter/receiver apparatus, and
   wherein said transmission/reception management apparatus further comprises:
   a second call information transmission control storage apparatus that stores control information as to whether transmission of said respective second call origination information is to be performed with respect to each of said one or more mobile transmitter/receiver apparatus; and
   a first control apparatus that controls said second call information transmission apparatus such that said respective second call origination information is transmitted solely when said control information stored in said second call information transmission control storage apparatus indicates that said respective second call origination information is to be transmitted.

10. The transmitter/receiver system according to claim 1, said one or more mobile transmitter/receiver apparatus further comprising a second transmission on-off controller that transmits, to the transmission/reception management apparatus, information as to whether the transmission/reception management apparatus should transmit said respective second call origination information to another of said one or more mobile transmitter/receiver apparatus, and wherein the transmission/reception management apparatus further comprises a second control apparatus that controls, if the mobile transmitter/receiver apparatus has made a request for transmission of said respective second call origination information to another of said one or more mobile transmitter/receiver apparatus, the second call information transmission apparatus such that said respective second call origination information is only transmitted to the another of said one or more mobile transmitter/receiver apparatus if information indicating that said respective second call origination information is to be transmitted to the another of said one or more mobile transmitter/receiver apparatus is transmitted by the second transmission on-off controller.

11. A transmitter/receiver system comprising:
one or more mobile transmitter/receiver apparatus comprising:
a telephone call transmission/reception device that transmits and receives respective audio data via a first carrier of a first frequency band and that receives respective first call origination information via said first carrier; and
a call origination information reception device that receives respective second call origination information via a second carrier of a second frequency band that is lower than said first frequency band; and
a transmission/reception management apparatus that manages transmission to and reception from at least one of said one or more mobile transmitter/receiver apparatus, said transmission/reception management apparatus comprising:
a telephone call management apparatus that governs an exchange, employing said first carrier, of said respective audio data between said at least one of said one or more mobile transmitter/receiver apparatus and at least one other mobile transmitter/receiver apparatus and a communication apparatus connected to said transmission/reception management apparatus;
a first call information transmission apparatus that transmits, when a call is made to any one of said one or more mobile transmitter/receiver apparatus, said respective first call origination information via said first carrier; and
a second call information transmission apparatus that transmits, when a call is made to said any one of said one or more mobile transmitter/receiver apparatus, said respective second call origination information via said second carrier,
wherein if said transmission/reception management apparatus cannot confirm receipt of said first call origination information although said respective first call origination information has been transmitted by said first call information transmission apparatus a predetermined number of times, said second call information transmission apparatus transmits said respective second call origination information via said second carrier.

12. A mobile transmitter/receiver apparatus for use in a transmitter/receiver system comprising one or more mobile transmitter/receiver apparatus and a transmission/reception management apparatus that manages transmission to and reception from said one or more mobile transmitter/receiver apparatus, comprising:
a telephone call transmission/reception device that transmits and receives audio data via a first carrier of a first frequency band and that receives first call origination information via said first carrier;
a call origination information reception device that receives second call origination information via a second carrier of a second frequency band that is lower than said first frequency band; and
a second transmission on-off controller that transmits to the transmission/reception management apparatus information as to whether the transmission/reception management apparatus should transmit said second call origination information to another mobile transmitter/receiver apparatus.

13. The mobile transmitter/receiver apparatus according to claim 12, wherein said second carrier has a frequency of at most 1 GHz.

14. A mobile transmitter/receiver apparatus according to claim 12, wherein said second carrier is a sideband of a broadcasting station carrier that as used for radio or television broadcasting.

15. The mobile transmitter/receiver apparatus according to claim 12, further comprising;
a telephone call transmission/reception on-off controller that governs an on-off state of said telephone call transmission/reception device, and
a call information reception on-off controller that governs an on-off state of said call origination information reception device.

16. The mobile transmitter/receiver apparatus according to claim 15, further comprising a controller that controls at least one of said telephone call transmission/reception device and said call origination information reception device based on an operating state of said telephone call transmission/reception device and an operating state of said call origination information reception device,
said controller limits a search in which said telephone call transmission/reception device is prompted to check for recovered reception of said first carrier, said search being carried out when said call origination information reception device is in an "on" state as governed by the call information reception on-off controller and said telephone call transmission/reception device has lost reception of said first carrier in spite of the fact that said telephone call transmission/reception device is in an "on" state as governed by the telephone call transmission/reception on-off controller.

17. The mobile transmitter/receiver apparatus according to claim 16, wherein said limitation of the search comprises extending the interval between checks for recovered reception as a function of an elapsed time since previous reception.

18. The mobile transmitter/receiver apparatus according to claim 15, further comprising a controller that controls at least one of said telephone call transmission/reception device and said call origination information reception device based on the operating state of said telephone call transmission/reception device and the operating state of said call origination information reception device,
said controller limits either a search in which said telephone call transmission/reception device is prompted to check for recovered reception of said first carrier or a search in which said call origination information reception device is prompted to check for recovered reception of said second carrier, said either of said searches being carried out when said telephone call transmission/reception device and said call origination information reception device have lost reception of said first and second carriers, respectively, in spite of the fact that both said telephone call transmission/reception device and said call origination information reception device are in an "on" state as governed by said telephone call transmission/reception on-off controller and said call information reception on-off controller, respectively.

19. The mobile transmitter/receiver apparatus according to claim 18, wherein said controller limits said search in which said telephone call transmission/reception device is prompted to check for recovered reception of said first carrier.

20. The mobile transmitter/receiver apparatus according to claim 15, further comprising a controller that controls at least one of said telephone call transmission/reception device and said call origination information reception device based on an operating state of said telephone call transmission/reception device and an operating state of said call origination information reception device,
said controller sets said call origination information reception device to an "on" state regardless of whether a current state of said call origination information reception device is set to an "off" state, when said telephone call transmission/reception device has lost reception of said first carrier in response to a predetermined signal in spite of the fact that said telephone call transmission/reception device is set to an "on" state.

21. The mobile transmitter/receiver apparatus according to claim 20, wherein said predetermined signal is an externally generated jamming signal.

22. The mobile transmitter/receiver apparatus according to claim 20, wherein the controller limits a search in which said telephone call transmission/reception device is prompted to check for recovered reception of said first carrier when said telephone call transmission/reception device has lost reception of said first carrier due to said predetermined signal.

23. The mobile transmitter/receiver apparatus according to claim 12, further comprising a state display device that displays an operating state of said telephone call transmission/reception device and an operating state of said call origination information reception device.

24. A mobile transmitter/receiver apparatus according to claim 12, further comprising a controller that controls at least one of said telephone call transmission/reception device and said call origination information reception device based on an operating state of said telephone call transmission/reception device and an operating state of said call origination information reception device.

25. A mobile transmitter/receiver apparatus according to claim 24, wherein said controller limits the operation of said call origination information reception device when said telephone call transmission/reception device is capable of transmission to and reception from said transmission/reception management apparatus.

26. The mobile transmitter/receiver apparatus according to claim 25, wherein the operational limitation of said call origination information reception device consists of turning off said call origination information reception device.

27. The mobile transmitter/receiver apparatus according to claim 12, wherein said telephone call transmission/reception device transmits status information to the transmission/reception management apparatus, when said telephone call transmission/reception device is capable of reception of said first carrier.

28. The mobile transmitter/receiver apparatus according to claim 12, further comprising an electronic key that allow the transmitter/receiver apparatus to adopt the capabilities of an electronic vehicular key.

29. The mobile transmitter/receiver apparatus according to claim 12, further comprising an information output device that outputs at least a portion of said second call origination information received by said call origination information reception device using at least one of speech/sounds, characters, and images.

30. The mobile transmitter/receiver apparatus according to claim 29, further comprising:
an identification information storage device that stores at least one piece of identification information identifying each of one or more communication terminals; and
an identification information determination device that determines whether said received first or second call origination information includes a piece of identification information stored by said identification information storage device,
wherein said information output device outputs at least a portion of said received first or second call origination information if said determination by said identification information determination device is affirmative.

31. The mobile transmitter/receiver apparatus according to claim 30, further comprising an identification information change-addition-deletion device that changes, adds to, and deletes identification information stored by said identification information storage device.

32. The mobile transmitter/receiver apparatus according to claim 29,
wherein said call origination information reception device is capable of receiving at least one of a radio broadcasting station carrier and a television broadcasting station carrier, and
wherein said information output device outputs at least one of a radio broadcast and a television broadcast via at least one of said radio broadcasting station carrier and television broadcasting station carrier.

33. The mobile transmitter/receiver apparatus according to claim 12, wherein, when the mobile transmitter/receiver apparatus receives the first carrier, the mobile transmitter/receiver apparatus notifies a user based on said received respective first call origination information, and when the mobile transmitter/receiver apparatus receives the second carrier, the mobile transmitter/receiver apparatus outputs notification information indicating that there was a call based on said received respective second call origination information.

34. A communication management apparatus that manages an exchange of audio data via at least one of a physical communication link and a wireless communication link between communication terminals, comprising:
a second call information transmission apparatus capable of transmitting second call origination information to any one of said communication terminals via a second carrier that is a predetermined carrier; and
a control apparatus that controls said transmission of the second call origination information by said second call information transmission apparatus,
wherein if the communication management apparatus cannot confirm receipt of a first call origination information that has been transmitted by a first call information transmission apparatus via a first carrier of a first frequency a predetermined number of times, the second call information transmission apparatus transmits the second call origination information via the second carrier of a second frequency band that is lower than the first frequency band.

35. The communication management apparatus according to claim 34, wherein said predetermined carrier is a broadcasting station carrier or a sideband thereof.

36. A broadcast receiver apparatus that receives a broadcasting station carrier as used for radio or television broadcasting and that outputs a broadcast via said broadcasting station carrier using at least one of speech/sounds, characters, and images, comprising:
a call carrier reception device that is capable of receiving a second carrier that is a predetermined carrier used by a communication management apparatus that manages an exchange of audio data via at least one of a physical communication link and a wireless communication link between communication terminals to transmit second call origination information to one or more of said communication terminals; and
a call information output device that outputs the second call origination information received by said call carrier reception device that uses at least one of speech/sounds, characters, and images,
wherein, when the call carrier reception device receives a first carrier of a first frequency, the call information output device notifies a user of the call origination information based on received first call origination information, and when the call carrier reception device receives the second carrier of a second frequency band that is lower than the first frequency band the call information output device outputs notification information indicating that there was a call based on received second call origination information.

37. The broadcast receiver apparatus according to claim 36, wherein said predetermined carrier is a sideband of said broadcasting station carrier.

38. The broadcast receiver apparatus according to claim 36, further comprising:
an identification information storage device that stores at least one piece of identification information identifying each of one or more communication terminals; and
an identification information determination device that determines whether said received first or second call origination information includes a piece of identification information stored by said identification information storage device, wherein
the call information output device outputs at least a portion of said received first or second call origination information if said determination by said identification information determination device is affirmative.

39. The broadcast receiver apparatus according to claim 38, further comprising an identification information change-addition-deletion device that changes, adds to, and deletes identification information stored by said identification information storage device.

40. The broadcast receiver apparatus according to claim 38,
wherein said broadcast receiver apparatus is a radio apparatus installed in a vehicle,
wherein said identification information storage device stores, in respective association with said at least one piece of identification information of the communication terminals, identification information identifying each of one or more electronic keys capable of locking a door of the vehicle, unlocking the door, and starting an engine of the vehicle, and
wherein said identification information determination device determines whether said received first or second call origination information includes a piece of identification information stored by said identification information storage device in association with the identification information of the electronic key that has been used to unlock the door and/or start the engine.

41. A method of attempting communication of call origination information to a target communication terminal, comprising at least one of:
establishing at least one of a physical communication link and a wireless communication link suitable for exchanging audio data between communication terminals; and
establishing a broadcasting transmission through a broadcasting station carrier as used for radio or television transmission/reception;
the method further comprising:
deciding whether said communication is to be attempted via said at least one of a physical communication link and a wireless communication link, said broadcasting station carrier, or both depending on at least one of a caller's preference, the preference of a target communication terminal user, the ability to establish said at least one of a physical communication link and a wireless communication link, and the success of attempted communication of said call origination information to said target communication terminal via said at least one of a physical communication link and a wireless communication link,
wherein, if the origination information has yet to be received via said at least one of a physical communication link and a wireless communication link although the call origination information has been transmitted via said at least one of a physical communication link and a wireless communication link a predetermined number of times, at least part of the call origination information is transmitted via the broadcasting station carrier at a frequency that is lower than a frequency band used by said at least one of a physical communication link and a wireless communication link.

42. The method according to claim 41, wherein if the success of attempted communication of said call origination information to said target communication terminal via said at least one of a physical communication link and a wireless communication link cannot be confirmed, communication of said call origination information to said target communication terminal is attempted via said broadcasting station carrier.

43. The calling method according to claim 41, wherein if attempted communication via said broadcasting station carrier has been requested by a user of said target communication terminal, communication is attempted via said at least one of a physical communication link and a wireless communication link and said broadcasting station carrier.

44. The calling method according to claim 41, wherein if attempted communication via said broadcasting station carrier has been requested by a caller, communication is attempted via said at least one of a physical communication link and a wireless communication link and said broadcasting station carrier.

45. A transmitter/receiver system comprising:
one or more mobile transmitter/receiver apparatus comprising:
a telephone call transmission/reception device that transmits and receives respective audio data via a first carrier of a first frequency band and that receives respective first call origination information via said first carrier; and
a call origination information reception device that receives respective second call origination information via a second carrier of a second frequency band that is different from said first frequency band;
a transmission/reception management apparatus that manages transmission to and reception from at least one of said one or more mobile transmitter/receiver apparatus, said transmission/reception management apparatus comprising:
a telephone call management apparatus that governs an exchange, employing said first carrier, of said respective audio data between said mobile transmitter/receiver apparatus and at least one other mobile transmitter/receiver apparatus and a communication apparatus connected to said transmission/reception management apparatus;
a first call information transmission apparatus that transmits, when a call is made to any one of said one or more mobile transmitter/receiver apparatus, said respective said first call origination information via said first carrier;
a second call information transmission apparatus that transmits, when a call is made to said any one of said one or more mobile transmitter/receiver apparatus, said respective second call origination information via said second carrier;
a second call information transmission control storage apparatus that stores control information as to whether transmission of said respective second call origination information is to be performed with respect to each of said one or more mobile transmitter/receiver apparatus; and
a first control apparatus that controls said second call information transmission apparatus such that said respective second call origination information is transmitted solely when the control information stored in the second call information transmission control storage apparatus indicates that the call origination information is to be transmitted; and
a first transmission on-off controller that transmits, to said transmission/reception management apparatus, information as to whether the transmission/reception management apparatus should transmit said respective second call origination information to said one or more mobile transmitter/receiver apparatus.

46. The transmitter/receiver system according to claim 45, wherein said second carrier has a frequency of at most 1 GHz.

47. The transmitter/receiver system according to claim 45, wherein said second carrier is a broadcasting station carrier as used for radio or television broadcasting.

48. The transmitter/receiver system according to claim 47, wherein said second carrier is a sideband of said broadcasting station carrier of an area in which said mobile transmitter/receiver apparatus is being used.

49. The transmitter/receiver system according to claim 47, wherein said second call information transmission apparatus transmits said second call origination information by superimposing said respective second call origination information on said broadcasting station carrier.

50. The transmitter/receiver system according to claim 45, wherein said second call information transmission apparatus transmits said respective second call origination information a plurality of times.

51. The transmitter/receiver system according to claim 50, wherein the second call information transmission apparatus transmits said respective second call origination information a plurality of times at predetermined intervals.

52. The transmitter/receiver system according to claim 50, wherein the second call information transmission apparatus transmits said respective second call origination information a plurality of times at intervals that are changeable in accordance with call or carrier traffic.

53. The transmitter/receiver system according to claim 45, wherein if said mobile transmitter/receiver apparatus has yet to receive said first call origination information although said first call origination information has been transmitted by said first call information transmission apparatus a predetermined number of times, said second call information transmission apparatus transmits said second call origination information via said second carrier.

54. The transmitter/receiver system according to claim 45, the mobile transmitter/receiver apparatus further comprising a second transmission on-off controller that transmits, to the transmission/reception management apparatus, information as to whether the transmission/reception management apparatus should transmit said respective second call origination information to another of said mobile transmitter/receiver apparatus, and
wherein the transmission/reception management apparatus further comprises a second control apparatus that controls, if the mobile transmitter/receiver apparatus has made a request for transmission of said respective second call origination information to another of said mobile transmitter/receiver apparatus, the second call information transmission apparatus such that said respective second call origination information is only transmitted to another mobile transmitter/receiver apparatus if information indicating that said respective second call origination information is to be transmitted to the another mobile transmitter/receiver apparatus is transmitted by the second transmission on-off controller.

55. A transmitter/receiver system comprising:
one or more mobile transmitter/receiver apparatus comprising:
a telephone call transmission/reception device that transmits and receives respective audio data via a first carrier of a first frequency band and that receives respective first call origination information via said first carrier; and
a call origination information reception device that receives respective second call origination information via a second carrier of a second frequency band that is different from said first frequency band; and
a transmission/reception management apparatus that manages transmission to and reception from at least one of said mobile transmitter/receiver apparatus, said transmission/reception management apparatus comprising:
a telephone call management apparatus that governs an exchange, employing said first carrier, of said respective audio data between said at least one of said mobile transmitter/receiver apparatus and at least one other mobile transmitter/receiver apparatus and a communication apparatus connected to said transmission/reception management apparatus;
a first call information transmission apparatus that transmits, when a call is made to any one of said mobile transmitter/receiver apparatus, said respective first call origination information via said first carrier; and a second call information transmission apparatus that transmits, when a call is made to said any one of said mobile transmitter/receiver apparatus, said respective second call origination information via said second carrier, wherein when the mobile transmitter/receiver receives the first carrier, the mobile transmitter/receiver notifies a user based on said received respective first call origination information, and when the mobile transmitter/receiver receives the second carrier, the mobile transmitter/receiver outputs notification information indicating that there was a call based on said received respective second call origination information.

* * * * *